(12) United States Patent
Hosier, Jr.

(10) Patent No.: US 10,949,080 B2
(45) Date of Patent: *Mar. 16, 2021

(54) ONLINE SYSTEMS AND METHODS FOR ADVANCING INFORMATION ORGANIZATION SHARING AND COLLECTIVE ACTION

(71) Applicant: Gerald Douglas Hosier, Jr., Crested Butte, CO (US)

(72) Inventor: Gerald Douglas Hosier, Jr., Crested Butte, CO (US)

( * ) Notice: Subject to any disclaimer, the term of this patent is extended or adjusted under 35 U.S.C. 154(b) by 11 days.

This patent is subject to a terminal disclaimer.

(21) Appl. No.: 15/059,301

(22) Filed: Mar. 2, 2016

(65) Prior Publication Data

US 2016/0188201 A1  Jun. 30, 2016

Related U.S. Application Data

(63) Continuation-in-part of application No. 15/008,121, filed on Jan. 27, 2016, which is a continuation of
(Continued)

(51) Int. Cl.
| | |
|---|---|
| *G06F 3/00* | (2006.01) |
| *G06F 3/033* | (2013.01) |
| *G06F 3/0488* | (2013.01) |
| *G06F 3/0482* | (2013.01) |
| *G06F 3/0484* | (2013.01) |
| *H04L 29/08* | (2006.01) |
| *H04L 12/58* | (2006.01) |
| *G06F 3/0481* | (2013.01) |
| *G06Q 50/00* | (2012.01) |

(Continued)

(52) U.S. Cl.
CPC ........ *G06F 3/04883* (2013.01); *G06F 3/0482* (2013.01); *G06F 3/04817* (2013.01); *G06F 3/04842* (2013.01); *G06F 3/04847* (2013.01); *G06F 40/166* (2020.01); *G06Q 30/0241* (2013.01); *G06Q 50/01* (2013.01); *H04L 12/185* (2013.01); *H04L 51/32* (2013.01); *H04L 67/306* (2013.01); *H04W 4/21* (2018.02); *H04W 4/022* (2013.01); *H04W 4/08* (2013.01); *H04W 4/185* (2013.01)

(58) Field of Classification Search
CPC ....... G06F 2203/04804; G06F 3/04842; G06F 3/04883; H04W 4/21
USPC .......................... 715/753, 200, 234, 863, 745
See application file for complete search history.

(56) References Cited

U.S. PATENT DOCUMENTS

| | | |
|---|---|---|
| 7,949,611 B1 | 5/2011 | Nielsen |
| 8,321,364 B1 | 2/2012 | Gharpure et al. |
| (Continued) | | |

OTHER PUBLICATIONS

Alfred Lua, The Complete Guide to Facebook Groups: How to Create a Group, Build a Community and Increase Your Organic Reach, published Dec. 14, 2018 via Wayback, pp. 1-49 (PDF).*
(Continued)

*Primary Examiner* — Manglesh M Patel
(74) *Attorney, Agent, or Firm* — Law Offices of Gerald D. Hosier

(57) ABSTRACT

Methods and systems and mobile device interfaces for creating, joining, organizing and managing via mobile devices affinity groups in a cloud computing environment for social and business purposes.

12 Claims, 36 Drawing Sheets

Related U.S. Application Data application No. 14/202,115, filed on Mar. 10, 2014, now Pat. No. 9,253,609.

(60) Provisional application No. 62/128,418, filed on Mar. 4, 2015, provisional application No. 61/778,345, filed on Mar. 12, 2013.

(51) Int. Cl.
*H04L 12/18* (2006.01)
*H04W 4/21* (2018.01)
*G06Q 30/02* (2012.01)
*G06F 40/166* (2020.01)
*H04W 4/18* (2009.01)
*H04W 4/08* (2009.01)
*H04W 4/021* (2018.01)

(56) References Cited

U.S. PATENT DOCUMENTS

| | | |
|---|---|---|
| 8,761,101 B1 | 6/2014 | Crosbie |
| 8,781,498 B2 | 7/2014 | Rothschild |
| 8,880,069 B2 | 11/2014 | Filipovic |
| 8,886,128 B2 | 11/2014 | Hubner |
| 8,930,459 B2 | 1/2015 | Mallet |
| 9,009,231 B2 | 4/2015 | Poikselka |
| 9,032,029 B2 | 5/2015 | Diner |
| 9,055,410 B2 | 6/2015 | Deshpande |
| 9,064,374 B2 | 6/2015 | Jabara |
| 9,094,390 B1 * | 7/2015 | Rao .................. H04L 67/306 |
| 9,253,609 B2 | 2/2016 | Hosier, Jr. |
| 9,324,078 B2 * | 4/2016 | Palahnuk ............ G06Q 30/00 |
| 2003/0096621 A1 | 5/2003 | Jana et al. |
| 2011/0208958 A1 | 8/2011 | Stuedi et al. |
| 2013/0061156 A1 | 3/2013 | Olsen |
| 2013/0275509 A1 | 10/2013 | Micucci et al. |
| 2014/0282016 A1 | 9/2014 | Hosier, Jr. |
| 2015/0295872 A1 | 10/2015 | Hawruluk |
| 2016/0142887 A1 | 5/2016 | Hosier, Jr. |
| 2016/0188201 A1 | 6/2016 | Hosier, Jr. |
| 2017/0024091 A1 | 1/2017 | Hosier, Jr. |

OTHER PUBLICATIONS

Rainie et al., "Coming and Going on Facebook," Pew Research Internet Project (Feb. 5, 2013).
Bennett, "The Dunbar Number, From the Guru of Social Networks," Bloomberg Businessweek (Jan. 10, 2013).
Ronald Coase—Wikipedia, the free encyclopedia (last modified Feb. 5, 2014).

* cited by examiner

Login and Welcome Screen

New Tracked Object (hapyning ᔆᴹ)

List Page

New Messages Stream

Tracked Object Message Stream

Tracked Object Message Reply

Tracked Object About Page

Post to About Page

Profile Page

Post to Profile

Invite Another to Tracked Object

Notifications

List Page

New Messages Stream

Manage Page

Manage Profiles

Manage Preferences

About Page sub-Sections

Public About sub-Sections in Private Hapynings

Profile Enhancements

Creating a Ping Group from Message Screen

Creating a Ping Group from the Who Page

Drilling into Ping Stream

Ping Groups as an Organizational Feature

Public Ping Groups from Private Hapynings

Other Types of Tracked Objects from the Manage Page

List

Manage Page

New Public Tracked Object (hapyning℠)

Manage Public Preferences

List with Groups

Creator View

Delegate Members non-Creator View

New Business Tracked Object (hapyning℠)

Manage Business Preferences

List with Groups

Creator View

Delegate Members non-Creator View

New Classified Tracked Object (hapyning℠)

Manage Advertising

Fig. 32A

Advertise University Bikes
- ☐ Deals Stream
- ☒ Deals Tab

Geographical Limit:
Users within _____ miles of _____,

Keywords in hapynings:
type keywords here

Number of members in Hapyning:___

Include members and hapynings active in the last ___ days

Current Criteria reach ___ users

Cost per tap: ___

Maintain Ad criteria for X days.

Maintain Ad criteria for X dollars per day.

Maintain Ad criteria for X dollars total.

( Submit advertising with above criteria )

← Back

Fig. 32B

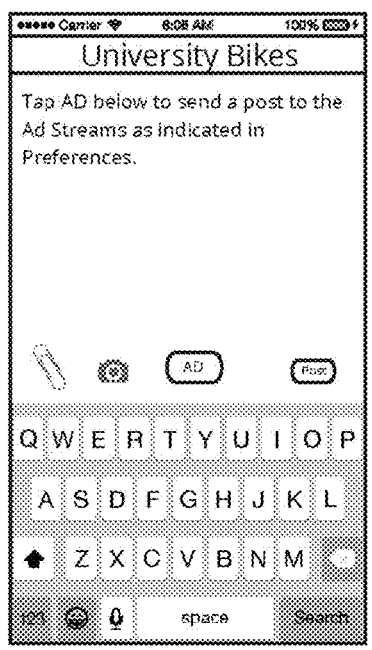

Fig. 32C

Deal Stream

The Deal Tab

Search

ONLINE SYSTEMS AND METHODS FOR ADVANCING INFORMATION ORGANIZATION SHARING AND COLLECTIVE ACTION

CROSS-REFERENCE TO RELATED APPLICATION

This Application claims the benefit of the filing date under 35 U.S.C. § 119(e) of U.S. Provisional Application Ser. No. 62/128,418, filed Mar. 4, 2015. Applicant's other applications include U.S. application Ser. No. 15/008,121 filed Jan. 27, 2016, which is a continuation of U.S. application Ser. No. 14/202,115, filed Mar. 10, 2014 (issued as U.S. Pat. No. 9,253,609 on Feb. 2, 2016), which claims the benefit of the filing date under 35 U.S.C. § 119(e) of U.S. Provisional Application Ser. No. 61/778,345, filed Mar. 12, 2013. All of the above referenced provisional applications, non-provisional applications, and patents are herein incorporated by reference in their entirety for all purposes.

COPYRIGHT AND TRADEMARK STATEMENT

A portion of the disclosure of this patent document contains material that is subject to copyright protection. The copyright owner has no objection to the facsimile reproduction by anyone of the patent document as it appears in the Patent and Trademark Office patent records, but otherwise reserves all copyright rights. Several trademarks are identified and used in this application. All rights to such trademarks are fully reserved to the trademark owner.

FIELD OF THE INVENTION

The invention relates generally to mobile "smart" phones, tablet and other computers with wireless communications capabilities, to "apps" stored on and useful in such devices including new and improved human-device interfaces, the processes performed by such apps, and to cloud based "software as a service" and similar platforms and as well to cloud based methods and systems particularly suited for interaction with such devices.

BACKGROUND AND DESCRIPTION OF RELATED ART

The advent and stunning growth in popularity of "smart" mobile phones, mobile tablet computers and similar devices has led in turn to the development of hundreds of thousands of "apps," shorthand for software applications, that users may have preinstalled on their mobile devices or which users may selectively download to their devices from an internet "store" or other remote location. Many such apps perform highly targeted, specific tasks beneficial to the user.

This mobile technology has, among other things, offered users the opportunity to conduct myriad business and personal activities (including those involving high levels of interaction with other individuals, groups, website based communities and businesses) in a timely fashion while "on the go." The combination of mobile phones, mobile tablet computers and the like with apps and cloud computing centers has created a highly customizable platform that has led to a burst of innovation, but much remains to be done to take full advantage of the opportunities offered by these technologies.

With cloud computing, selectively sharing of information with any number of third-parties has become more convenient and more prevalent, the well-known Google docs and Google sites applications being familiar examples of ways of creating, storing and selectively sharing a wide range of information with others. There are many other familiar examples of the creating and sharing of information via the internet including the so-called "social applications," such as Facebook, Twitter, LinkedIn, Tumblr, YouTube, Google+, website-based communities, messaging apps, such as iMessage by Apple, WhatsApp, now owned by Facebook, and various email services, e.g., GMail, that enable users to connect to business counterparts, their "friends" and others to share and exchange information or data with them.

As described more fully in the "Background and Description of Related Art" section of the aforementioned formal and provisional applications, the myriad of existing mobile applications, particularly those cloud-based applications now popularly known for embodying "social, mobile and local" capabilities, have created a cacophony of separate, sometimes complementary, but most often overlapping and/or competing applications. These applications have varying "features" and deficiencies, such that users often find themselves jumping from app to app to access features they seek, confronting different, and often inconvenient (and/or confusing) user interfaces for accessing the various app features, and encountering the differing privacy standards imposed by the app owner.

The forms of business and social communication in wide use today, such as the many email apps and the many texting/messaging apps, as well as the many social media apps that allow individuals and groups to form and interconnect, have serious shortcomings. For example, email is based on an outmoded post office paradigm where communications are formally addressed with a date, to, from, cc, bcc, subject line and signature line which often includes as well the business name, business title, address, phone, fax, mobile phone and other contact information of the sender, all part of message "overhead" displayed along with the substantive content of the message. Attachments are electronically appended to or "enclosed" with the message like enclosures to a letter.

Messages thus composed are "sent" as individual and inseparable packets to each of the named recipients, like letters deposited with the post office. The above described email "overhead" often occupies more screen space than the substance of the communication, which is particularly problematic for users of relatively small screen mobile phones. In all events, such message overhead pointlessly distracts the recipients' attention from the substance of the message, a form of cognitive tax not offset by any significant substantive benefit.

With email, it is particularly burdensome and annoying when it is necessary to read in context a string of emails, each incorporating the same repetitive message overhead. Moreover, finding and accessing one or more attachments of interest in long strings of past emails with many attachments is exceptionally time consuming and inconvenient, prompting many users to download email attachments to their computers or mobile devices for filing in electronic folders on such devices or, alternatively, to upload the attachments to cloud based storage systems, such Google Drive or its equivalent, for filing there in electronic folders created by the user. These organizational burdens, which are similar to dealing with physical documents and files in paper form, are distracting and time consuming.

Continuing to use GMail as representative, emails only "go away" if they are archived, deleted or otherwise affirmatively acted upon by the user in a manner similar to one's handling of letters, documents and the like placed in a physical inbox. Many users neglect to perform these affirmative actions with the result that hundreds if not thousands of emails accumulate in the user's inbox. Alternatively, to clear their inboxes, more organized users may perform many, perhaps a hundred or more archiving and/or deleting steps per day, another nuisance "job" and distracting cognitive tax. Archived emails in GMail are placed in a "haystack" filing system, to be found by initiating a search, another burdensome "job," or by opening folders where the attachments were previously filed or by relying on electronic criteria for sorting incoming emails into various categories, with varying, but usually unsatisfying, levels of accuracy and refinement. Serious email users are all too familiar with these and the many other shortcomings of email.

Texting and messaging apps obviate the formality, and aspects of the associated complexity, of email as above described, but still transmit information in indivisible packets, like physical letters, and tend to be useful only for simple, in the moment communications and in the moment sharing of photos or the like. The younger demographic in particular abhors email while business people cling to email for business, but often use texting for personal matters. The simplicity and informality of texting/messaging is both its advantage and shortcoming as demonstrated by the fact that this form of communication has not found currency as a substitute for email.

Users should not have to jump from one app to another (e.g., email to message app, and vice versa) for formal/informal communications and/or for other forms of social interaction. A single app that has the simplicity and ease of texting/messaging but satisfies the needs of more formal or fulsome communication, and as well the needs of wide ranging social interaction and information sharing, e.g., photos, videos and documents, in a largely self-organizing manner is a highly desirable goal unmet by the prior art.

Beyond email and messaging, social interaction often originates with web based communities which use websites as a way of creating and binding people to their online communities. For example, businesses and social groups of all kinds, profit and nonprofit, have historically created websites with varying levels of depth and complexity as a means to enable users to engage with them online. Since visiting of websites, even if the user is sufficiently motivated to create and use "bookmarks," is relatively inconvenient, businesses have come to send emails and texts, to any user who will accept them, as a means of maintaining the entity in the forefront of users' minds. Passively awaiting users to visit one's website is not a route to success for business, nor a path for promoting effective social interaction in other online communities.

Large organizations often spend millions of dollars building and maintaining their websites. For small, local businesses, website creation, updating and maintenance is relatively (or prohibitively) expensive and difficult, often requiring expensive professional assistance. It is also relatively difficult and expensive for such small businesses, charitable organizations and the like to generate fresh emails or texts on a daily or weekly basis and, even if they are able to do so, users are naturally reluctant to accept emails from all but a handful of such entities lest their inboxes become inundated with information in which they have only occasional interest. Thus, small businesses and other entities are distinctly disadvantaged in the online world.

Over the past decade an ever growing percentage of emails received by typical email users, from then perhaps thirty-forty percent to now often eighty to ninety percent, are machine generated (as opposed to a human being), most often by an entity seeking the users' attention and/or money. This is not spam, but machine generated email recipients have willingly opted to receive to facilitate interaction with the sender. A significant and growing percentage of texts are also autogenerated. For example, it is estimated that about one-third of all Twitter "tweets" are generated electronically by machine bots and that the percentage of machine generated emails/texts are ever increasing. Researchers estimate that the expected continuing increase in such machine generated data, coupled with the impending "internet of things," will result by 2020 in forty percent of all internet data being auto-generated by machine. Better ways are needed for enabling users to manage such voluminous, frequently sent, machine generated data.

Email, text messages and the like, whether received from machines or humans, prompt profoundly stimulus-driven behaviours by users. Such stimuli are largely unpredictable as email/texts and the like are typically ordered by time received, not subject matter. The repetitive switching between disparate tasks in going from email to email imposes a substantial cognitive tax; it is exhausting, depleting of cognitive processing and costly for productivity. Creating and implementing automated techniques for attempting to sort incoming emails by subject matter is not reliable and imposes yet another burdensome task on the user, and the ordinary person is simply unwilling or unable to take on these tasks. There is a long felt need for new, more useful and less cognitively taxing paradigms for mobile, social and local communication.

BRIEF SUMMARY OF THE INVENTION AND ITS OBJECTIVES

As described more fully in the aforesaid provisional and formal application, the goal of the invention there described and the modifications, variations and improvements here described is to provide effective solutions to the aforementioned and other shortcomings of the prior art. What is needed is a app, app interface, and cloud based systems and methods, embodying, among other things, the popular social, mobile, local model and that is intuitive and easy to see and use, particularly on the relatively small screen of a mobile phone.

The invention enables, within a single mobile app, access to many popular features, and even access to independent apps, through a single platform having a simple interface that is familiar, easy and intuitive to use and navigate. The invention enables default modes that protect the identity and privacy of the user, and allows a compromise of identity and privacy only when and to the extent consent is knowingly given by the user.

In short, the invention is designed from the standpoint of what is best for the user, as opposed to what is in the best interest of app owners and advertisers. Advertising in the context of the invention is a service to the user to be seen only when desired, as opposed to the current practice of thrusting unwanted advertising in the face of the user as the price of admission to purportedly "free" apps. The invention enables a virtual self-organization of online communications and almost entirely eliminates the many cognitively taxing tasks, such as archive, delete and file, associated with other online platforms.

It is an objective of the invention to provide new and improved methods, systems, apps and app/human interfaces for mobile, social communication for individuals as well as national and local business/non-business entities.

It is an object of the invention to provide, among other things, methods, devices, systems, apps and app interfaces to enable users to more conveniently and selectively engage, without an excessive cognitive tax, with social/business communications/data of all kinds, including machine generated electronic communications.

It is an object of the invention to enable users to interact with the mobile phone app of the invention within the natural sweep of one thumb while holding the mobile phone, large or small, in either the left or right hand, and regardless of whether the user's hands are large, average or small. Users are able to tap, swipe and use other familiar gestures, easily executed with one thumb, to navigate the app. Active portions of the mobile screen initially beyond the reach of the natural arc of a thumb sweep are easily swiped into thumb range thereby to obviate the necessity for two-handed gripping of the phone for navigation and performance of other tasks.

It is an object of the invention to provide simple, easy to use apps, app interfaces, cloud platforms, methods, devices and systems for enabling highly organized and efficient bilateral, online communication. Among other things, repetitive, annoying tasks such as delete, archive and file, are obviated, message overhead as earlier described is obviated and communications are naturally organized without placing unnecessary burdens on the user.

These and the many other objectives of the invention, as described in part above and in the earlier identified provisional and formal applications, will become apparent to the reader from the drawings and written description that follows.

BRIEF DESCRIPTION OF THE DRAWINGS

In order to describe the manner in which the above-recited and other advantages and features of the disclosure are obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings, in which:

FIGS. 32A-C are wire frame diagrams depicting the management of advertising preferences.

DETAILED DESCRIPTION OF THE INVENTION

The following description is presented to enable any person skilled in the art to make and use the embodiments, and is provided in the context of particular applications and their requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the inventive principles and features disclosed herein.

Figure 1:
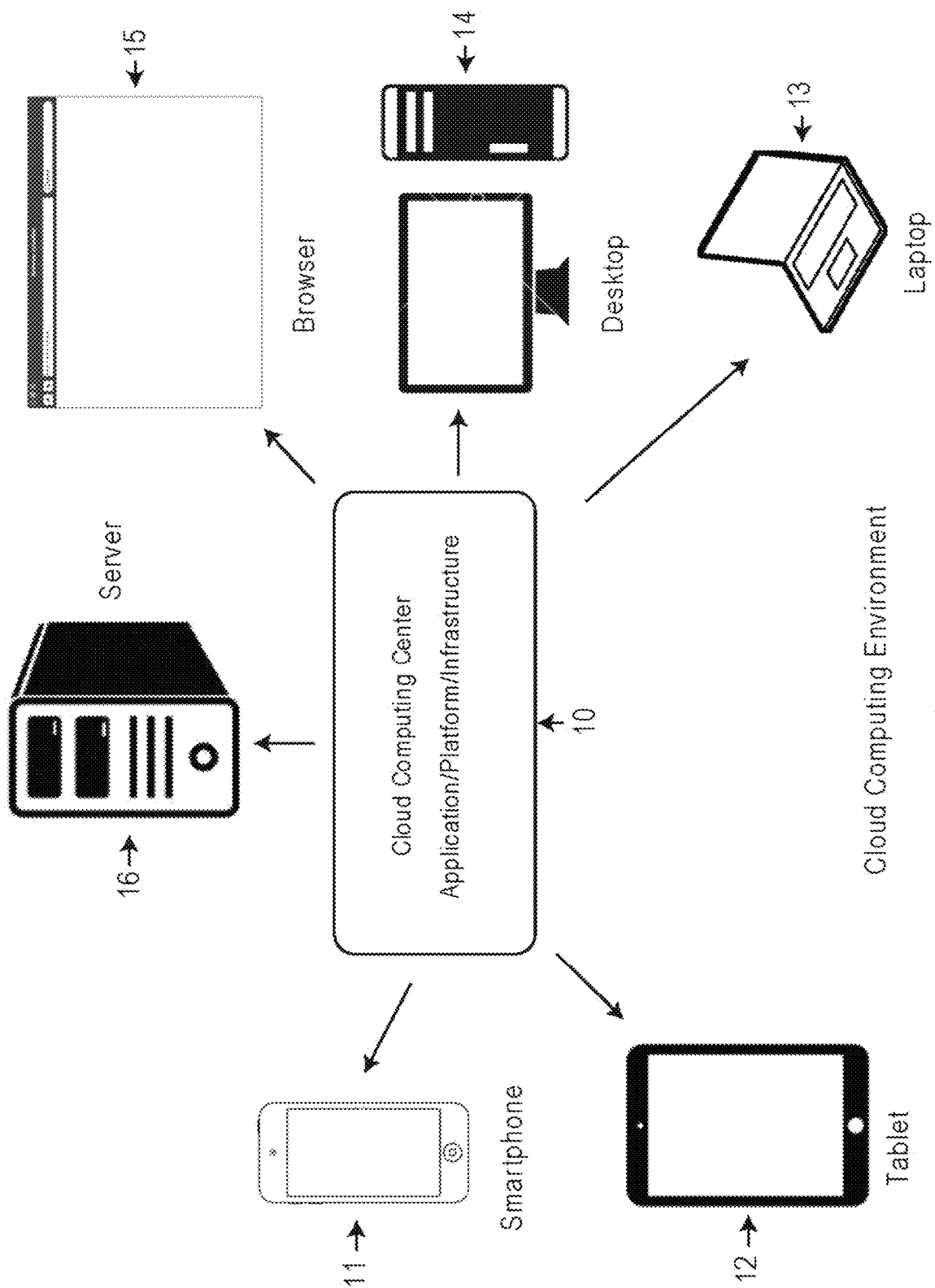
FIG. 1 is a diagrammatic depiction of a conventional cloud computing environment comprising a remote or cloud computing center and any number of mobile or other devices, e.g., mobile phones and mobile tablet computers, laptop and desktop computers, computer browsers and servers, that communicate wirelessly and in a well-known manner with the cloud computing center.

FIG. 1 here is similar to FIG. 1 in the provisional and formal applications to which priority is claimed. FIG. 1, which shows subject matter well known to the art, is provided here solely for context and background to the invention.

FIG. 1 depicts the conventional and now familiar cloud computing environment comprising a cloud computing center 10 that communicates bilaterally and wirelessly (and in some cases by wire) with a large number of distant and geographically dispersed computing and communication devices that may include: (a) smartphones, exemplified in the drawing by the single mobile smartphone 11 (e.g., iPhones, Iwatch, Android phones, Google Glass, etc.); (b) mobile tablet computers, exemplified in the drawing by the single tablet computer 12 (e.g., iPads, Android based tablets, the Microsoft "Surface" tablet, etc.); (c) conventional laptop and desktop computers respectively depicted in the drawing by the numerals 13 and 14; (d) computer servers denoted by the numeral 16; and (e) computer browsers, denoted by numeral 15 (collectively "devices"). The devices communicate directly with the remotely located cloud computing center 10 and indirectly with one another through the computing center 15. The devices may also connect with one another through cell phone towers or the like, all in well-known fashion.

In the present state of the art, the mobile devices typically have many downloaded or pre-installed apps that perform certain computer, memory and other functions locally within the device as directed by a local software application. The local "app" assures rapid response to user commands, while more complex matters are offloaded to controlling applications at the cloud computing center.

There may come a time in the not too distant future when mobile devices need not have a sophisticated local app as increased wireless information/data transmission speeds will allow all or near all computer, memory and other functions to be performed entirely by the remote computing center on a virtually instantaneous basis. In such event, the mobile devices may omit expensive electrical components, like powerful microprocessors, extensive memory and sophisticated app software. Such simplified phones, like "dumb" terminals, are much less expensive to produce and purchase, but the user will perceive no slowdown in responsiveness or other degradation in performance.

For convenience, the invention will be described in the context of a smartphone having a downloaded or pre-installed app, although those skilled in the art will appreciate that the invention works equally well with any other device and/or if all, or nearly all, of the computational, memory and other functions are performed remotely at the cloud computing center rather than in material part on the device.

Tens of thousands, hundreds of thousands and even millions of users of such devices may connect to remotely located cloud computing centers as common users of the same mobile software apps, applications, widgets and/or templates, etc. of diverse kinds (collectively "apps"). The computing centers host the controlling programs for each such mobile app in a manner well understood in the art. Such centers store vast amounts of user and other data, and are able to undertake complex computational, analytical and other tasks, such as so-called big data analytics. Typically, at least a substantial portion of user data is stored in cloud based relational databases of well-known design to enable the users' selective retrieval and selective use of the stored information pertinent to a particular app.

The cloud computing center typically hosts many applications and provides computing infrastructure and platforms including an operating system, a programming language execution environment, a database, and a web server. Controlling software programs for mobile device apps hosted at the computing center perform wide ranging tasks, such as retrieval of a user's stored data for selective display on the user's device (e.g., photos, videos, documents, sound files), word processing, spreadsheet and presentation programs, complex computational and data handling functions, voice recognition/voice response and analysis of complex data for purposes of data visualization, to name just a few of the currently well-known computing center capabilities available to app developers.

Apps resident on the mobile device provide a user/device interface, some local device level functionality and the communications capability for accessing the host and controlling programs for that app at the computer center and for accessing other resources at the computing center. This now familiar and ever improving cloud architecture and app architecture enable the easily scalable, efficient and low cost off-loading of vast data storage, processor intensive, complex computational and other functions from individual devices to remote cloud computing centers, such as those operated by Amazon, Akamai, Apple, Microsoft, Google and many other companies. Cloud computing centers bring supercomputer capabilities to mobile smartphones.

Those skilled in the art will recognize that there are many hundreds of thousands of such apps currently available for use on the iPhone, Android and other mobile platforms. The basic architecture and functions above described, the rules of app and controlling program design to perform desired app features on a device, their implementation in a cloud environment and as well as numerous functions performed on demand at the computing center in response to a user's interactions with a mobile app interface are well understood to those skilled in the art. Such known matters are not further described herein.

The present invention relies upon and makes use of the known and continually advancing app and cloud computing environment above described, as well as the ever advancing sophistication and functionality of mobile devices, to bring new and important user functionality to mobile and other computing/communication devices. The unique architecture and structure of the present invention is enabled to provide continually advancing functionality as mobile devices and cloud computing technology further evolve and as desktop/laptop computer operating systems converge with mobile device operating systems. Desktop and laptop devices are trending toward having touch screens like those now widely used in mobile devices. In short, the power and utility of the present invention grows with the inevitable technological advances in mobile phones, utilitarian apps, tablets, laptop/desktop computers and cloud computing centers, rather than trending toward obsolescence.

Figure 1A:
FIG. 1A is a conceptual diagram useful in understanding aspects of the invention.

FIG. 1A is a conceptual diagram helpful in understanding the invention (as described herein and in the prior patent applications to which priority is claimed) and how the invention advances and greatly improves all forms and types of social communication. The diagram depicts at its center what is termed a "tracked object" 20. The tracked object 20 is the unique identifier and anchor point for social interaction between two individuals and up to and including extraordinarily large groups, private or public. In a special, simple case application, the invention also provides utility to a single user in ways that will become apparent on reading this specification.

The tracked object 20 may be assigned a unique identifier in various ways as will become apparent to those skilled in the art. A preferred way is for the tracked object creator to give it a meaningful name, such as "Bike Club," in a manner akin to the designation of a "subject" for an email or text message. This name and the identities of the tracked object creator and the addressees/invitees taken together uniquely identify the tracked object. If the creator does not give the tracked object 20 a name (similar to one neglecting to fill in the subject line in a text or email), the system assigns a unique identifier based preferably on the identity of the creator and addressees 21, but, if desired, on other properties as well, such as the date and time created.

If a user later attempts to create a new tracked object identical to one already in existence, either one named or unnamed, the system may provide, for example, a screen notification that an identical tracked object already exists, and offer the user the option of going to the existing tracked object or renaming the tracked object then being created. Alternatively, the system may take the user directly to the pre-existing tracked object thereby to avoid creation of duplicative tracked objects. Although not presently preferred, the system may use other or additional criteria for uniquely identifying the tracked object.

Linked to and associated with the tracked object 20 are: (1) the creator and addressees 21 for the tracked object 20 as specified by the tracked object creator in a manner seen by the user to be similar to addressing an email or text message; (2) a "Who" section 23 comprising individual personal profiles for the creator and each addressee, as composed and posted by each group member for himself or herself in a manner to be described; (3) an "About" section 24 comprising information of common interest to the addressee/invitee group as posted from time to time by any one or more of the authorized addressees in accordance with controlling rules established in well understood ways and implemented by widely understood cloud based software code; (4) a message composition and message content section called message stream 22 for the communication of written, verbal or other messages between the tracked object group members in a manner perceived by the user to be similar to familiar text messaging or email.

Additional linked pages or sections may be added to the system if needed or desired for a particular situation, such as a separate document management section specially designed or selected for demanding document management situations, but the system as described embraces the needs of most online social interactions. The individual lines shown in the drawing as extending between the tracked object 20 and each of the sections 21-24 in FIG. 1A denote the link or association of the tracked object 20 with each of the individual sections. The sections 22-24 may be separately viewable as individual pages on the screen of a mobile device and separately changed or modified by the system or by users, as will be seen. Each section is accessed via different device screen pages and, if desired, content is added to, or modified by, the user in accordance with predetermined rules, that is, controlling software or the like. In mobile devices, and particularly mobile phones, navigation between the sections or pages, namely, About, Who and Messages Stream is accomplished with intuitive, easily performed gestures, as will be seen.

Provision of a separate Who page for the tracked object creator and addressees removes from the message page distracting and cognitively taxing "message overhead," such as a long list of addressees repeated in every message. Instead the addressees appear on the Who page; only the message author is identified in each message thereby to minimize nonessential information. The identity of everyone in the message group is identified in the easily accessed Who section or page along with their individual profiles, information not available in emails and messages, and typically only accessible if the user creates and maintains a separate contacts application. This architecture also facilitates, among other things, individual addressees being able to permanently withdraw from continued participation in the group, i.e., the tracked object, delete the user's own content where authorized, and the ability of the creator, or others authorized by the creator, to permanently remove one or more addressees from the group.

The Who page or section 23 also eliminates from the message stream page 22 additional distracting and cognitively taxing "message overhead," such as the creator's formal signature line, lengthy contact information and the annoying "Confidentiality" statements included in virtually all business emails. As will be seen, every participant in the system creates his or her own profile which may range from a minimal default profile used for all tracked objects or may include detailed contact information, text, multiple photos, videos and the like uniquely and separately designed for each tracked object.

The user may create a unique profile for each tracked object and update or modify the profile from time to time or the user may pre-select a common default profile for some or all tracked objects, and only customize profiles for tracked objects when desired. This enables the user to put forward the face or identity preferred for the particular group, or for convenience or privacy to simply rely on a default profile. For example, a lawyer or venture capitalist may have a professional profile for business groups and a different, far more exciting profile for his skydiving club.

With the Who page of the invention, no longer is it necessary for a user to ask another person for their contact information, or V-card, which request further burdens the user with the task of installing the contact information in the user's separate contact application. No longer is it necessary to ask another for their updated contact information, nor is it necessary to maintain a separate contacts application at all, nor is necessary to leave the tracked object for a separate contacts application to obtain information needed about one or more of the tracked object addressees. Rather, as will be seen, a simple gesture brings the user to the Who page, where a single tap on a name brings up the profile of that person as the person wishes the profile to be seen in the context of the particular tracked object. The user may add private comments to the profile of the person and may view tracked objects the parties have in common. The creator may quickly and easily change his or her personal profile for the particular tracked object on the Who page. A single tap toggles the user back to the message page.

The priority patent applications disclose techniques for the creation of a master profile and profile elements which may be mixed and matched to quickly create unique profiles for different tracked objects. With potentially millions of individuals posting profiles in the ecosystem, the option could be provided to individuals to craft a public profile and to provide a search function enabling identification of all profiles meeting certain search criteria. This approach would give far more power to individuals to identify and establish associations without interference from a controlling entity, like LinkedIn. For organizations, their About pages could be made public thereby enabling them to be discovered via search or otherwise and build a following.

The About section 24 enables matters of common interest to be shared in a single place in an organized way with appropriate textual description. Special applications, such as for separately managing videos, photos and documents, maps and search, may be associated with the About page 24 to optimize the organization, presentation and discovery of information on the About page. For example, for an individual or a small profit or nonprofit entity, the About page may serve as a web page that is easily created and maintained by an ordinary person without need for expensive expert assistance. With the About page, no longer is it necessary to search through a long string of emails or texts for attachments, nor perform one or more searches to locate desired information. The About page unburdens the message stream from carrying attachments, photos or the like which get in the way of a crisp, clear presentation and reading of verbal messages, although the message stream may be provisioned to include attachments if desired.

Each of the four sections or elements 21-24, or at least the three primary sections (Messages, About and Who), above described has its own unique properties as established by the app and the controlling program at the cloud computing center. Each of elements 21-24 may be added to or modified, subject only to the rules or preferences of each section and/or the system as a whole, as determined by controlling software. The design and implementation of such controlling programs are well within the skills of persons of ordinary skill in the art.

The Message, Who and About pages 22-24 linked to the tracked object 20 are viewed on separate screen pages of a mobile device. In effect, there are three channels of closely linked information that compose the social interaction within each group or tracked object. The Who page includes the identity of the creator and all addressees. The Message page comprises the uncluttered verbal communications between the tracked object members, while the About page includes the information of common interest to the group. Navigation between the screen pages may be accomplished quickly, even with one thumb using simple gestures. Information on the About page 24 and the Who page 23 may be updated or modified by directly interacting with the respective screens. Description of the convenient and intuitive navigation among these pages or sections on a device, particularly a small screen mobile device, and many other aspects and features of the invention are described below and in the applications to which priority is claimed.

The invention embodiments presently to be described offer additional and highly advantageous ways of achieving the goals and objectives described in the earlier identified parent applications to which priority is herein claimed. The reader is referred to the disclosures of these earlier applications for additional background information and for the detailed description of further invention embodiments.

FIGS. 2-13 depict a first invention embodiment in a schematic form comprising a series of wireframe diagrams representative of gesture navigable and related user interactive sections or screen pages displayed on a conventional mobile phone, such as an iPhone or Android phone. As will be seen, users are able to easily compose and "send" messages (complex or simple), post information separately from the message body in two separate locations, such as personal profiles and matters of common interest to the message addresses, and engage in other diverse, highly productive social interaction, most such actions via intuitive, easy to perform, gestures of a kind widely used and familiar to mobile phone users.

Mobile smartphones are available in widely varying physical sizes for use by persons with different preferences in using such devices, varying hand sizes and handedness, i.e., left or right handed. One aspect of the invention is to aid all such users to largely, if not fully, navigate the mobile phone interface (one invention feature) and access a range of important information with a single thumb while holding the phone in one hand.

While FIGS. 2-13 illustrate one preferred embodiment of the present invention in the context of a smartphone, those of ordinary skill in the art will recognize that the invention is also applicable for use on mobile tablets, mobile/laptop computers or desktop computers. As earlier noted, the devices may rely almost entirely on the cloud computing center for controlling software and computational capacity thereby eventually allowing inexpensive, relatively simple devices to perform, from the user perspective, in the manner of current smartphones.

The screens shown in FIGS. 2-13 depict, among other things, the kinds of information displayed to the user, the range of user functions available, the ergonomics of user-interface interactions, the relative priorities for functions, the rules for displaying and accessing certain kinds of information, and the effect of different scenarios on the display. The wireframes further depict the connection of the underlying structure or information architecture to the user interface of the mobile app.

Like the various invention embodiments shown in the aforementioned priority applications, the exemplary embodiment shown in FIGS. 2-13 is of particular utility in the organizing of any of a wide range of human endeavor, business and personal, profit and nonprofit, around interests, events or activities, and things (living and nonliving), that is, virtually anything, herein collectively termed "tracked objects," or even more succinctly "objects."

For instance, collecting, such as stamps, watches and a myriad of other things, is one of a virtually unlimited number of interests around which people might organize, even if they are not close friends, "friends" at all in any traditional sense, and even if they do not know one another. It is the interest or common affinity, i.e., the tracked object, that connects them, not their personal relationships. This is in contrast to, for example, organizing around people talking about themselves or to, or with, "friends," as is common practice in the familiar social applications, such as Facebook and Google+.

People and other things including content may come and go from a "tracked object," but the object remains the focal point. Properties of, and associations with, the tracked object may change from time to time, and, if desired, may be changed retroactively by the user through allowed preference selections. For example, users initially authorized to access the tracked object and participate in the group activity may later be de-authorized. Users may be authorized or not to invite others to the tracked object, messages in the tracked object may disappear after viewing or after a specified time, initially unnamed tracked objects may be named, and so on. Many of these rules may be fixed by the system and immutable from the standpoint of the user. For others, the system may allow the user to choose preferences, and in some cases retroactively change preferences. This is in diametric contrast to the post office model of communication where all parts of a communication are inseparable and are sent and received as a single packet or parcel. In the tracked object architecture, all information related to elements 20-24 of FIG. 1A is hosted at the cloud computing center and the tracked object members effectively visit this information and are enabled to make additions, modifications and take other authorized actions according to the master rules and permissions, controlling host software, and user selected preferences. The tracked object based organizational structure of the invention yields many benefits, as will be seen.

Other than for an immediate or mid-range circle of family and friends, people typically associate with others for special purposes via common interests, events, clubs, condo or homeowners' associations, work or charitable projects, professional associations, sports and so on, which are the tracked objects in the present system. Some tracked objects may be permanent and unvarying, like family, some may be transitory, like planning a wedding and others may be fleeting, such as coordinating a weekend bike ride, or a neighborhood picnic with individuals assembled only for that purpose. Yet other tracked objects, like fraternities, sororities, alumni associations, hobbies (e.g., flying model planes), club memberships, professional associations, workgroups within companies, mothers arranging weekly rides and sharing photos for kids' sports teams, scientist or business collaborations and so on may be long term interests involving significant numbers of people (even in certain cases people with whom the user is not personally acquainted). Further, tracked objects may be of a kind that the user only wants to passively observe or only participate in sporadically.

In short, the number and identity of people linked as users to each tracked object will vary markedly according to the nature of the tracked object, the nature of the users, the nature of the content and so on. The possibilities are virtually limitless thereby making it useful for a person to interact in aggregate with potentially hundreds or thousands of people in many separate groups as the invention enables the interaction to be done in ways that are beneficial and not burdensome.

The filing or archiving structure for content may be haystack style, non-hierarchical or may take other forms, the important thing being that information is conveniently available to all authorized users for a tracked object. The three primary elements establish an organizational core structure that is useable, or customizable, by individual users, user groups or app developers (in more complex cases) thereby to apply to tracked objects of any kind, all with user defined boundaries in terms of participants and other pertinent criteria.

The invention empowers individuals, facilitates interaction between individuals, and facilitates interaction within and between groups in important ways not heretofore accomplished. The invention has utility in all aspects of human endeavor. The invention further enables new forms of commercial marketing and advertising and other desirable activities without compromising personal privacy and without the objectionable intrusiveness all too common in the prior art.

The invention is designed to enable use of and interaction with other commercially available apps common to smart phones, like the built in still and video cameras, calendars, maps and other utilitarian apps prevalent in modern smart phones and mobile tablets. The invention easily incorporates and take full advantage of such utilitarian capabilities without the user having to exit the app of the invention and enter another app, and without requiring a user or app developer to "re-invent the wheel" simply to add well-known, but highly useful functionality to complement the invention.

Figure 2A:
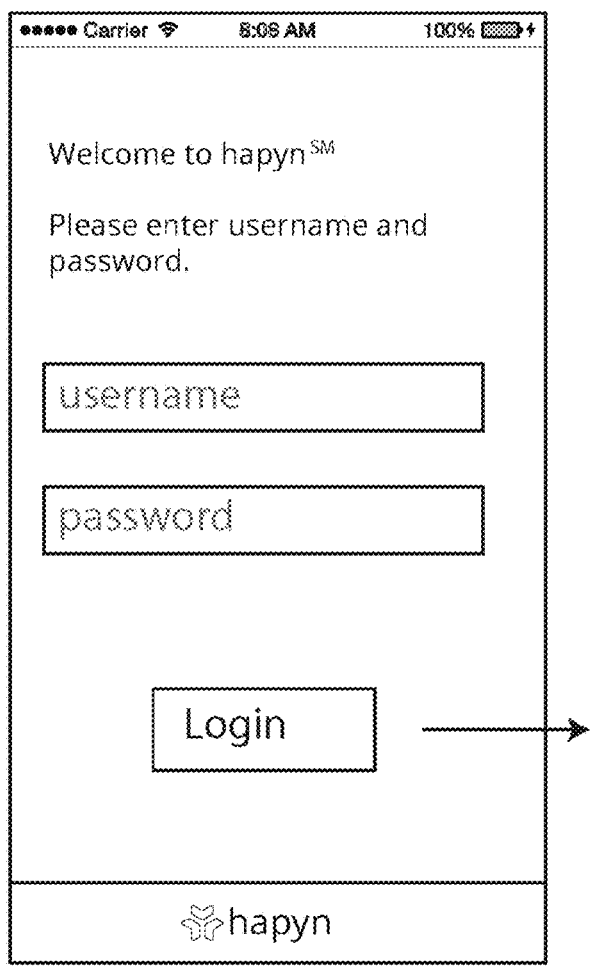
FIGS. 2A and 2B are, respectively, smartphone wireframe diagrams depicting exemplary Login and Welcome screens for a first embodiment of the invention.

Referring now to the drawings, FIG. 2A depicts a conventional and self-explanatory mobile phone login screen which requires the first time user to select a unique username and a unique password as a condition both for system access and for establishing a unique user identity. As is common practice, in order not to put off a prospective app user, an initial login screen is made as simple and minimal as reasonably possible; additional information about the user may be requested, or not, at a later time on a separate Account page, such as additional information required for access to premium services or for making purchases and payments through the system.

Figure 2B:
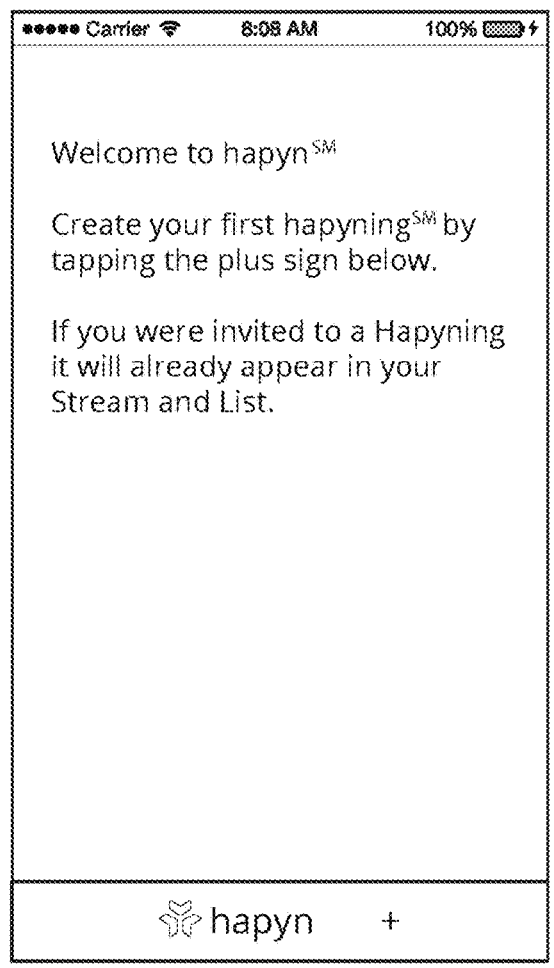

On successful login for the first time, the new user is presented with a one-time Welcome screen FIG. 2B which provides a brief orientation and direction on use of the app, a conventional practice in the mobile app world. A control bar or block at the bottom of the Welcome page includes from left to right a logo symbol positioned closely adjacent the word Hapyn$^{SM}$; both the logo and the word are trademarks and service marks owned by the applicant. The logo and service mark together comprise a first touch or gesture sensitive control space for navigation to another screen page, as will be later described.

A "+" sign is located sufficiently to the right of the first touch sensitive control space in FIG. 2B to define a second touch sensitive control space that enables a user to easily and reliably select one or the other with the user's thumb when the phone is held in one hand. The logo and service mark identify the app owner to the user and concurrently serve as a single touch or gesture point for navigation to certain screen pages, as will be described. It will be apparent to the reader that any word, symbol or the like may be used in place of the applicant's trademark and servicemark as a navigation touchpoint. It will also be understood that selective navigation through the screen pages of the app may be done by touch, by other gestures, by voice activation or some other approach. For ease of description, the single term "touch" is used herein, it being understood by the reader that other navigation options may be used consistent with the teachings of the present invention.

Figure 3:
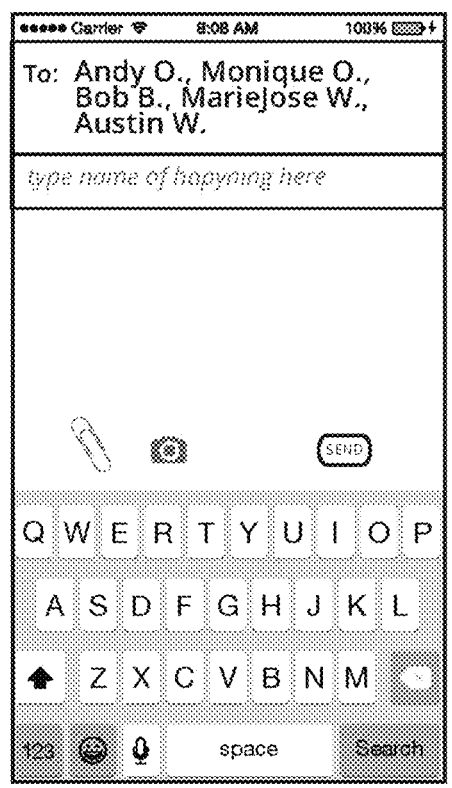
FIGS. 3-13 are representative smartphone wireframe diagrams depicting the format, structure and mode of operation of a first embodiment of the invention as well as certain embodiment features, variations and improvements.

The FIG. 3 screen page is presented to the user in response to the user's touch selection in FIG. 2B of the "+" sign, a familiar symbol suggesting something to be added. The "+" sign is the consistently used touch symbol in the described embodiment of the invention to be selected on a screen page whenever it is desired to create new messages and/or post new content associated with a tracked object.

To avoid intimidating or confusing a new user, the FIG. 3 screen is intentionally designed to appear similar to the kind of screen pages used for composition of standard text messages and emails. At the top of the screen, there is a "To:" block to identify those individuals being addressed or invited to the group, that is, the tracked object. In FIG. 3, the user has typed, dictated or otherwise caused the names of five individuals to be placed in the "To:" block. This may be done in any suitable way including all those ways used in composing conventional email or text messages.

Immediately below the "To:" block in FIG. 3 is a block containing, in a light gray font, the phrase "type name of Hapyning$^{SM}$ here;" the light font denoting in conventional fashion that the block may be filled in with a name to replace the gray text, or not, at the user's discretion. The word Hapyning$^{SM}$ is a trademark and service mark owned by the applicant; the trademark here refers to what has been earlier identified and defined as a tracked object. A third, generously sized block is provided for composing the message in contrast, for example, to the small window typical of text messaging applications. The message space includes familiar touch selectable icons to enable the user to selectively "attach" to the message documents, photos/videos and the like, all the icons being similar to the familiar icons used in connection with conventional text messages or emails. Since in FIG. 3 the user is in the process of typing a message, a keyboard has popped up on the screen in familiar fashion. While the Message does allow attachments, it is preferable in most instances for information collateral to the messages to be communicated to others via the Who or About pages.

Figure 4:

The FIG. 4 screen page, called the tracked object list page, or "list page" for short, lists and identifies by name all tracked objects with which the user is associated and does so in separate, individually touch sensitive blocks. The listed tracked objects are either those created by the user in the manner described with respect to FIG. 3, or created by another person in like manner who included this user as an addressee or invitee. For convenience, FIG. 4 shows the full list of this user's tracked objects; the reader will recognize that only a portion of this list is viewable on a mobile phone screen at any one time and that the list is scrolled to bring other tracked object blocks into view.

Because the list screen is scrollable, there is effectively no limit to the number of tracked objects with which the user may associate and still conveniently view by thumb scrolling of the mobile phone screen. Many of the identified tracked objects in the FIG. 4 list page are user named, such as Family and Friends, which indicates that the tracked object creator chose to fill in the naming space in FIG. 3 or retroactively selected a name. Other blocks in the list view only have the names of individuals which indicates that the user likely left the naming space in FIG. 3 blank, or for some reason used a person's name to identify the tracked object. If the tracked object is unnamed by the creator, the system assigns a unique identifier to the tracked object, which the user sees on the list view as the names of the group members (Susan B., James P., etc.); only a few of the individual names will be visible in the list view blocks for larger groups, but the full membership may be seen on the Who page presently to be described.

Certain of the tracked objects in FIG. 4, namely, Family, Theater Groups, Friends and Susan B., have a circle "M" to the right side of their respective blocks. This symbol visually indicates to the user that the tracked object has received new messages not yet acted upon or viewed by the user. Of course, any other symbol or indicator may be used to provide the new message notification. Notification is a familiar and widely used function in mobile phones apps.

The tracked objects may be ordered in the list view in any of several ways, such as alphabetically or, alternatively, by having those tracked objects with new messages always migrate to the top of the list with (or without) such tracked objects being ordered by the receipt times of the new messages. In FIG. 4, the tracked objects with new messages have migrated to the top of the list. As a further option, by selection of an edit icon or the like, the user may order the blocks in any way desired simply by placing a finger on the block and moving the finger (and block) to a new vertical location. Many well known apps use this technique so it is familiar to those skilled in the art and even to the average app user. This same approach may be used to create tracked object folders, for example, an "aviation" folder containing a number of aviation related tracked objects, such as aviation websites and other online aviation communities that send machine generated information of interest to the user, but which the user only needs or wants to view when interested in doing so. The invention thus allows the user to participate in many such online communities without being overrun by an avalanche of machine generated messages, particularly such messages commingled with other, more pressing communications.

The block format, scrollable list page, FIG. 4, enables the user to see at a glance all "social" things the user has going on and specifically which of the many named tracked objects have new messages, all without encountering clutter or unnecessary information. Seeing the new message indication in association with a tracked object identifier signals the subject of the new message, such as Family, thereby to indicate whether or not an immediate reply is needed. The user can view and act on a new message or not, as the user deems appropriate.

Since the message groups are separate, named tracked objects, the user is able to promptly identify the message subject matter by tracked object name, and act on those messages requiring immediate reading and/or response, while leaving new messages in other tracked objects to be read at the user's convenience. The tracked object structure and the list view as shown obviates the cognitive tax associated with use of conventional email and text messaging systems.

Figure 6:
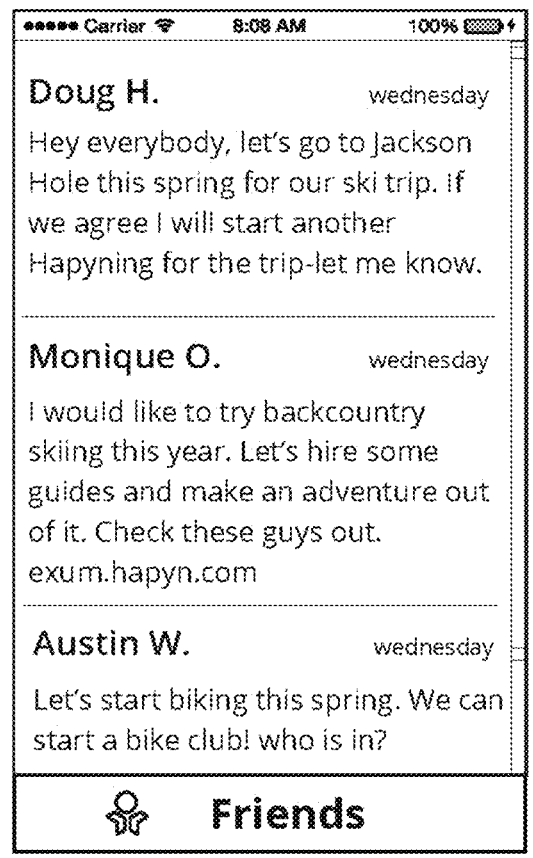

The user may view and/or act upon new messages in any of several ways. First, the user may tap a touch sensitive tracked object block in the FIG. 4 list view, such as Friends, to bring up the Friends message stream page as shown in FIG. 6, which contains only the stream of time sequential messages in the Friends tracked object. The new Friends message will be the last message in the Friends stream, preferably seen at the bottom of the screen for ease of thumb access, but new messages may alternatively appear at the top of the screen. The word "Friends" in a control block at the bottom of the FIG. 6 page identifies the message stream as being in the tracked object Friends. A reply to the new message is made by tapping once on the body of the new message in FIG. 6 with, for example, either thumb which brings up the tracked object message reply screen, labeled "Friends" in the header as shown in FIG. 7.

Figure 7:
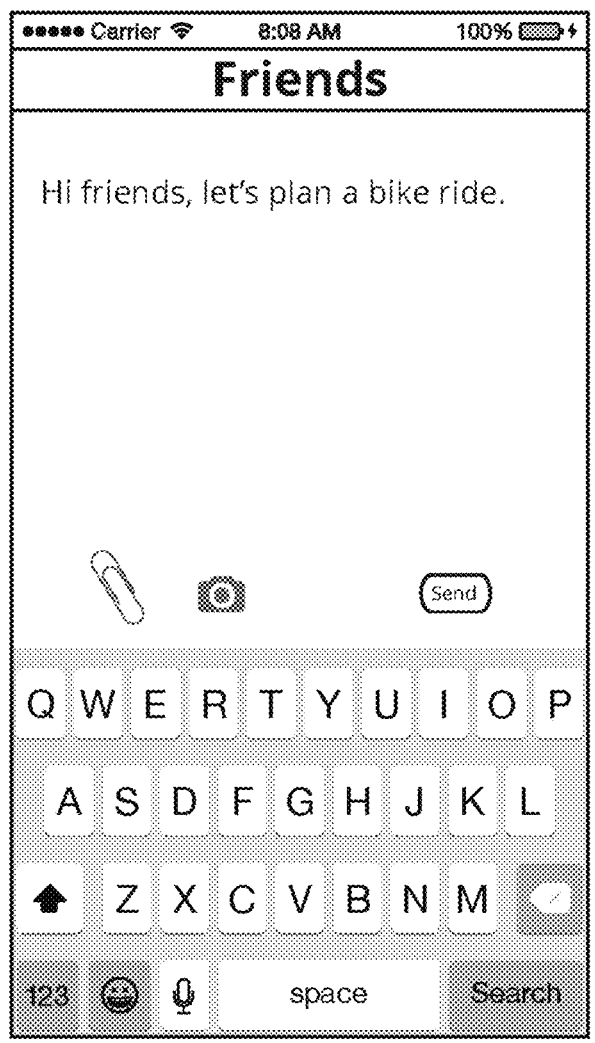

The user may also reach the new Friends message and tracked object message reply screen, FIG. 7, through a second or alternative route. Specifically, the user "swipes" left or right (or uses another predetermined gesture) on the FIG. 4 list screen to toggle to the FIG. 5 New Messages Stream page (swiping the FIG. 5 new messages page toggles the user back to the FIG. 4 list page). The FIG. 5 page preferably contains only new messages not yet acted upon and listed in the order received, with the most recently received new message preferably located at the bottom of the screen for easy thumb access.

If the user wishes to see all new messages at once in the time order received, this page (FIG. 5) is the place to do it. The user may choose this approach, rather than accessing new messages via List when, for example, there are only a few new messages and it is desired to read, reply or otherwise act upon, all of them. Messages may be removed from the New Messages page, FIG. 5, simply by swiping left or right on the message. Messages swiped off the FIG. 5 page are accessible by tapping the appropriate tracked object block on FIG. 4, such as Friends, which takes the user to the Friends message stream, FIG. 6, where the message swiped off the new messages page, FIG. 5, will be seen in its proper chronological sequence.

Figure 5:
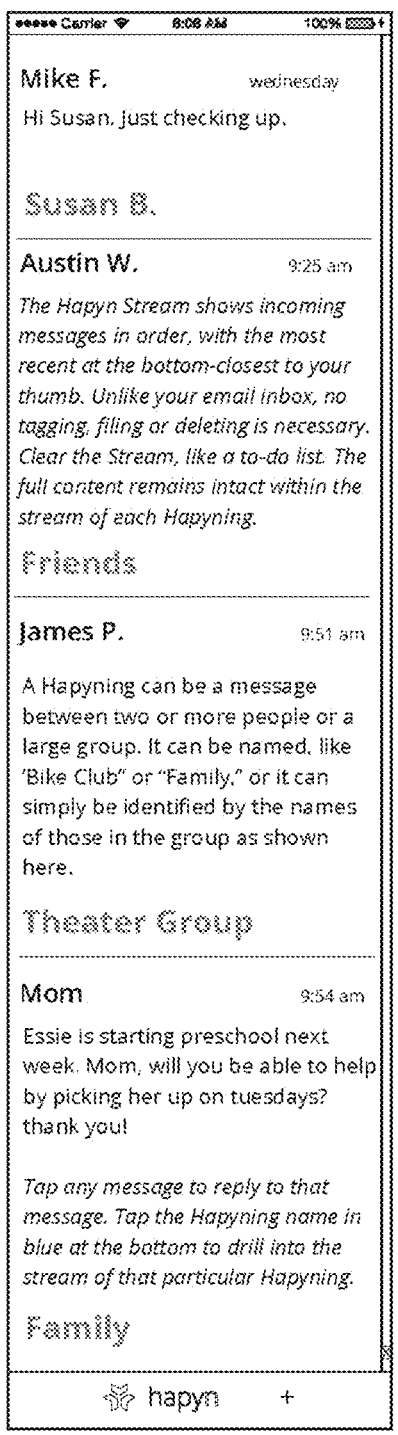

A simple gesture, such as a single tap on the new message text in FIG. 5, takes the user to a message reply screen as shown in FIG. 7. For example, in FIG. 5, a single tap on the text of the Austin W. new message takes the user to the message reply page, FIG. 7, which has the tracked object identifier, "Friends," in the reply page header. The Austin W. message in FIG. 5 is identified as a message in the Friends tracked object stream by the large font "Friends" identifier at the bottom of the Austin W. message. All other new messages have similar identifiers below the text of each new message, as seen in FIG. 5. Thus, even if a new message is first viewed on the FIG. 5 new messages page, the tracked object with which the message is associated is readily identifiable.

A double tap or a swipe on the text of a message in the FIG. 5 new messages page may be used to remove the new message from the New Message Stream, FIG. 5. Tapping on the large type font tracked object name in FIG. 5, e.g. Friends, takes the user to the Friends tracked object message stream shown in FIG. 6, where the user can read and act upon the new message from Austin W. in the context of the Friends message stream, for example, by tapping on the Austin W. new message text which brings up the message reply screen, FIG. 7.

Preferably, the act of replying to a new message automatically removes the message from the FIG. 5 new messages stream, although as another option the message may be retained on the screen until swiped off by the user. Thus, the new messages stream of FIG. 5 provides an ongoing list of only those new messages not acted upon by the user thereby to aid the user in recognizing and handling new messages in a prompt, organized way with minimum effort, and without having to view new messages in the context of messages already acted upon.

A message removed from the New Messages Stream Page of FIG. 5, such as by the user replying to it or swiping it off the screen, is not lost in a haystack of archived messages as typical with email; rather the message is found where one expects to find it, namely, in the message stream for the tracked object. For example, the new message from Austin W. in the Friends tracked object may be viewed and acted upon in the new messages stream of FIG. 5 or the user may tap on the "Friends" block in the FIG. 4 list page, which brings up the stream of messages in the tracked object Friends, as shown in FIG. 6, from which a reply may likewise be made. A touch sensitive block at the bottom of tracked object message stream, as shown by example in FIG. 6, always includes the tracked object name, here Friends, as a reminder to the user.

Initiating a reply to a message (done by a single tap on the message body), whether the message is accessed via the list view of FIG. 4 (which takes the user to the tracked object message stream, FIG. 6, where the new message from Austin W. is seen) or the new messages screen, FIG. 5, takes the user to the message reply page, FIG. 7. Since the reply as shown in FIG. 7 is to be made to a message from Austin W. in the Friends message stream, the name of the tracked object, Friends, is visible in a bar at the top of the reply page as a reminder to the user. To avoid confusing the user, the reply page is intentionally made in a form and format familiar to text message and email users. The mechanics of composing and sending the reply are routine and similar to those used in replying to a text or email message so they will not be described in further detail.

No addressees are shown on the Reply page, FIG. 7, since the reply is always made to all members of the Friends tracked object, and all of the members of the Friends tracked object are identified on the Who page (along with their profiles). This avoids unnecessary clutter on the reply and message screens. An embodiment described later herein, called Ping Groups, enables a user to selectively reply to any subset of member(s) of a tracked object group.

All tracked object message streams, like the exemplary Friends message stream shown in FIG. 6, have a control block at the bottom of the screen page with two independent and individually touch sensitive block portions, here a symbol connoting a person, which is a trademark/servicemark of applicant, and to its right the name of the tracked object, here Friends. Tapping on the tracked object name "Friends" in FIG. 6 takes the user to the About screen page for Friends, FIG. 8. Note that the two touch sensitive portion in the bottom block of FIG. 6 are also in the bottom block of the About page, FIG. 8. Tapping on the "Friends" block in either FIG. 6 or 8 toggles the user back and forth between the Friends Message Stream (FIG. 6) and the Friends About page (FIG. 8).

Figure 8:
Figure 10:
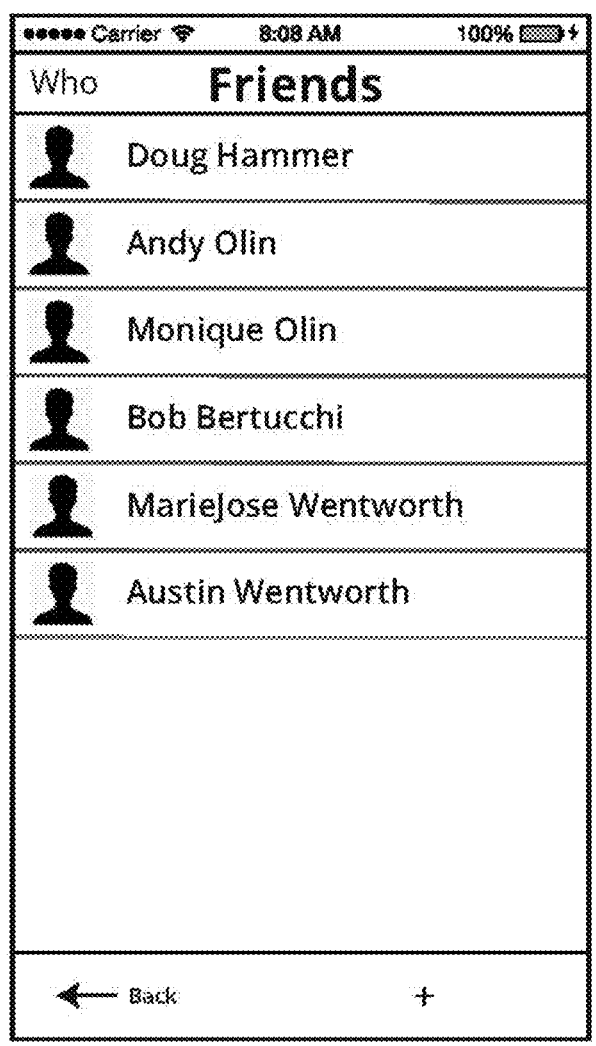

Tapping on the person icon in the bottom block of either FIG. 6 or FIG. 8 takes the user to the same place, namely, the Who page, FIG. 10. Tapping on the back arrow/"back" at the bottom of the Who page, FIG. 10, toggles the user back to the previous screen, that is, the screen through which the user reached the screen, FIG. 10. Toggling, as opposed to deeper menu selections, is preferred to make navigation between screens intuitive and readily apparent to the user.

Figure 9:
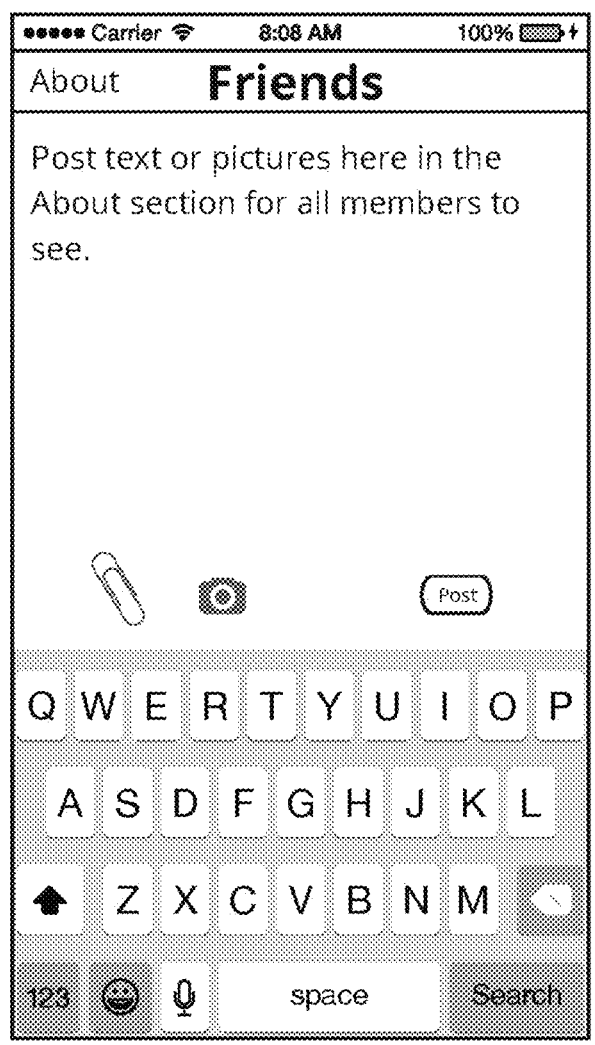

Tapping on the "+" symbol to the right of "Friends" in the bottom block of FIG. 8 takes the user to the Friends "Post to About" page, FIG. 9, where all members of the Friends group (i.e., the tracked object creator and those persons the creator identified in the "To:" block of FIG. 3) are permissioned to post information, preferably information of common interest to the group as a whole. The user may designate the information to be posted in a manner similar, from a user standpoint, to creating and sending text or email attachments, although more sophisticated tools may be used from the cloud computing center. FIG. 9 schematically depicts that photos/videos and documents may be posted on the About page, but other forms of content may be posted, if desired, in a manner well understood by those skilled in the art. It is preferred that photo postings along with any accompanying text be visible and that the About page be scrollable thereby to enable Friends and all other affinity groups (tracked objects) to share photos, etc. in a common place. At the time a photo, video, etc is taken, the user may be presented with a screen asking whether or where the photo should be posted, e.g., to the About page, to the individual's profile on the Who page or elsewhere, such as an attachment to the message itself or the user's photo library. Any one of these could be made a default selection in preferences, if that option is allowed.

The icons on FIG. 8, or their equivalent, may also be on the actual About Page to indicate to the user where files of a particular type are to be placed. For example, tapping on the FIG. 9 photo icon may open a photo application that is specially designed for the editing, organization and presentation of photos. The same may be true when tapping on the other content icons in FIG. 9. The About page has abundant uses beneficial to the group as a whole; it is a resource that may be used in any way the group desires. The About page may be made as simple or as sophisticated as desired in accordance with rules and preferences, all independent of the associated tracked object message stream.

Tapping on the person icon or "Who" symbol in the bottom block of either of FIG. 6 or 8 brings up the Who page, FIG. 10. A single tap on the touch sensitive arrow/"back" indicator takes the user back to the page from which the user accessed the Who page, namely, either the About page (FIG. 8) or the message stream page (FIG. 6). This toggle regimen assures that the user will not go down a rabbit hole and get lost.

Figure 13:
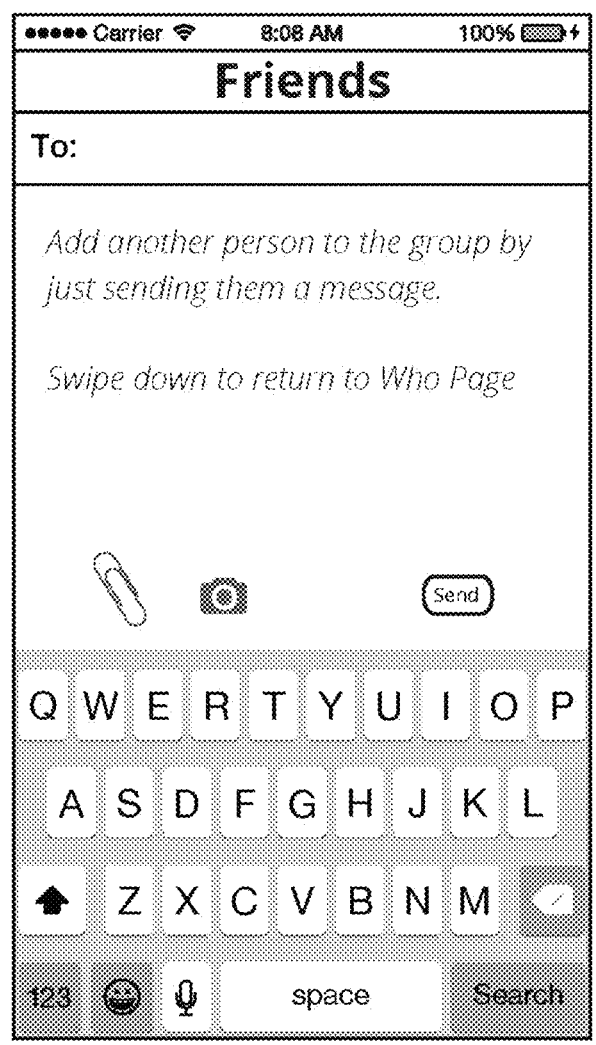

Tapping on the "+" symbol in the bottom block of FIG. 10 takes the user to the "Invite Another to Tracked Object" screen page FIG. 13; this page enables the user to invite others to the Friends group (as identified in the FIG. 13 header) by typing their names in the "To:" block and sending them a message that they have been added as members in the Friends group. The invite may include a text message and/or attachments. Swiping down on the FIG. 13 screen or sending the invitation returns the user to the Who page, FIG. 10. If the new invitee is already a member of the tracked object ecosystem, that person is automatically added to the group. The invite may include a choice enabling the invitee to reject the invitation. If the user is not an ecosystem member, the system sends the message to that person's email or text message address, where the recipient may choose or not to join the tracked object ecosystem and to accept/reject the invitation.

Figure 11:

Tapping on a name in the Who page, FIG. 10 takes the user to the Profile page for that individual, FIG. 11. Here the selected individual, Doug Hammer, has chosen to post his contact information, shown as contained in the "tap to expand" block, his resume in document form, photos, a video, another document and a sound file. The photos, etc., instead of being in separately openable blocks, may be a scrollable continuum of pictures and text, or the like, or in any other form desired by the user and enabled by the system, preferably from resources available at the cloud computing center. Tapping the touch sensitive word "Friends" in the bottom block of FIG. 11 takes the user to the Friends message stream page, FIG. 6. Tapping on the adjacent Who icon takes the user to the Friends Who page, FIG. 10.

If Doug Hammer is a member of a professional group of significant size, his profile page may substitute for, or serve him better than, for example, a LinkedIn page. The profile page may be composed by the user in any way suitable for engagement with the members of the particular tracked object group with which the user's profile is associated. Further material may be posted to the Profile page, FIG. 11, by tapping on the "+" icon in the bottom block of FIG. 11, which brings up the Post to Profile page, FIG. 12. Note that FIG. 12 and the other post and compose new message pages are very similar and of a form familiar to text and email users thereby to assure that the user may execute the desired tasks intuitively and easily. Of course, the post and message pages may be constructed in a different format, if desired, such as to allow the posting of information in a highly professional and attractive form through use of resources at the cloud computing center. The continuing advancement of cloud based platforms enables ever more and better resources being available for use with the present invention.

The content of the About page FIG. 8 and the content of the Who page FIG. 10 are composed separately from one another and and entirely independent of the Friends tracked object message stream (which may itself be used to share photos, etc.). Although having independent properties, the About, Who and Tracked Object Message Stream pages are linked via the unique tracked object identifier, and only authorized persons associated with the tracked object may participate in it in a manner determined by a system administrator and user selected preferences.

If desired, the message stream for the tracked object, such as Friends in FIG. 6, may be confined to verbal communications to promote clarity and easy reading of messages, and all common interest data and information in other forms may be located on the About page. In this regard, the messages shown in the tracked object message page, FIG. 6, have, in addition to the message itself, only the name of the message sender and the date and time the message was "sent;" the tracked object identifier for the message stream, here "Friends" is set forth in a bottom control block. The creator and addressees are found on the Who Page FIG. 10 along with their profiles, and content posted to the group by any of the group members is found on the About page, FIG. 8. The tracked object message stream, FIG. 6, is thus not burdened by "message overhead" or other information collateral to the verbal messages being exchanged. The Who and About pages, FIGS. 8 and 10, are each accessed by a single tap on the appropriate icon at the bottom of the tracked object message stream, FIG. 6. The Who and About pages contain not only the message overhead omitted from the message stream, but much more information; most significantly, these pages may include extensive information about the individual members (Who) and the group's common interest (About) thereby to greatly enrich the "social" interaction of the members of the tracked object group.

Figuratively speaking, the tracked object paradigm enables for any tracked object three separately accessible information channels (and more if desired), each a single tap away from the other (in the preferred mobile device navigation system of the invention) and collectively containing in a highly organized fashion the three most basic elements of human social interaction, that is, verbal communication between members of a group, a depth of information about each individual member (Who), and information of common interest to the group (About). In the cloud environment, the three channels of information are hosted in the cloud computing system and the members of the group effectively visit the host to access the information, a portion of the information being downloaded to each user on connection to this application at the cloud computing center. The cloud environment enables each of the three channels (and more) to individually take advantage of the extensive resources available on modern cloud based computing platforms thereby to enable highly sophisticated group communication and sharing of information in great amounts and in many forms. The About page, for example, may have the depth and sophisticated of a complex website for a large organization.

As shown in FIG. 8, different forms of information, e.g., photos, videos, documents, etc. may be posted to the tracked object About Page, here the Friends About page. Touching the "+" symbol in the bottom block of the FIG. 8 About page brings up the Post to About Page, FIG. 9. As shown in FIG. 9, the user may post text, documents and photos/videos, etc. to the About page in a manner similar, from the perspective of the user, to sending a text message, although more specialized and sophisticated posting pages may be used, if desired. Software especially suited for handling each form of information may be associated with the particular information at the cloud level to optimize posting, storage, access, editing and presentation of such information.

Figure 14A:
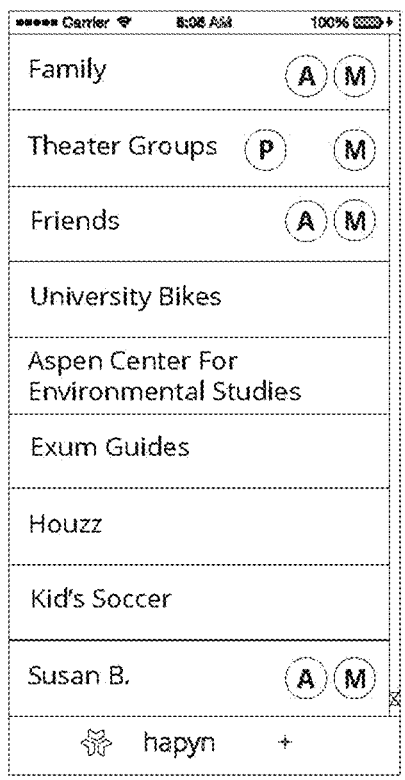
FIGS. 14A-14B are smartphone wireframe diagrams depicting a user notification feature of the invention, in this example, notification of new messages and new postings in what are here called the List and New Messages Stream pages.
Figure 14B:
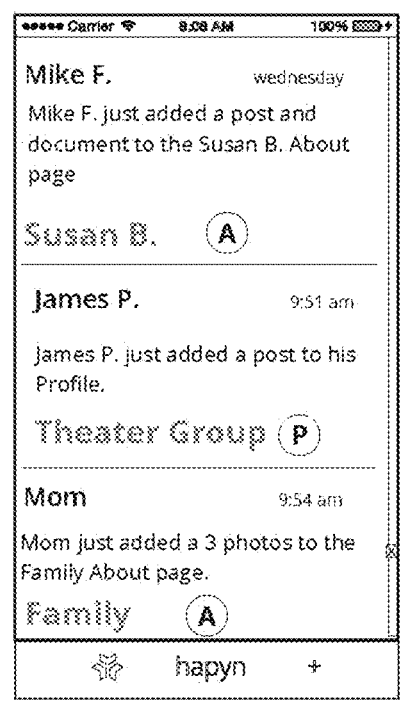

FIGS. 14A-B disclose an improved notification feature of the invention. In general, notifications are a familiar concept, particularly on mobile devices. Gmail, for example, provides a colored circle with a numeral inside indicating at a glance the number of new emails. Many other applications likewise provide notice of the receipt of new information. Notification is here applied to the unique environment of the invention where there are in the invention embodiment just described three distinct pages or streams that may receive new information, namely, Messages, About and Who.

The FIG. 14A list page is similar to that earlier described in connection with the FIG. 4 list page, except in FIG. 14A notification is separately provided for each of the three information pages. Specifically, as shown in FIG. 14A, the letters P, A and M in circles provide the user at a glance notification of whether there is new information in any or all of, respectively, the Profile, About and Message pages for each tracked object. In the FIG. 14A illustration, both the horizontal location and the letter identify the fact and type of new information, that is, new messages are identified by a circle M at the far right of the tracked object block, new About page information is identified by a circle A immediately to the left of the message notifier, and new profile information is identified by the circle P to the left of the circle A identifier. The notifications may be provided more minimally by using three solid dots of like color in place of the letters in circles with the horizontal dot locations identifying to the user which, if any, of the tracked object message, about and who pages have new information.

The FIG. 14B new messages stream page is similar to that earlier described in connection with the FIG. 5 new messages stream, except that in FIG. 14B notification of new information in the About and Profile pages is provided adjacent the tracked object identifier, for example, the large font Susan B., Theater Group and Family, located in the bottom portion of each new message block. New information identifiers are provided only for the About and Profile pages in FIG. 14B since the user is already looking at the new messages stream. A more minimal notification in FIG. 14B may be provided by using solid dots of like color, with the About notifier, for example, always located in a position to the right of the location used for the profile identifier. Thus, in either the list or new message pages, the user is separately notified at a glance of the fact of new information in the message, About and Profile pages of each tracked object.

Figure 15A:
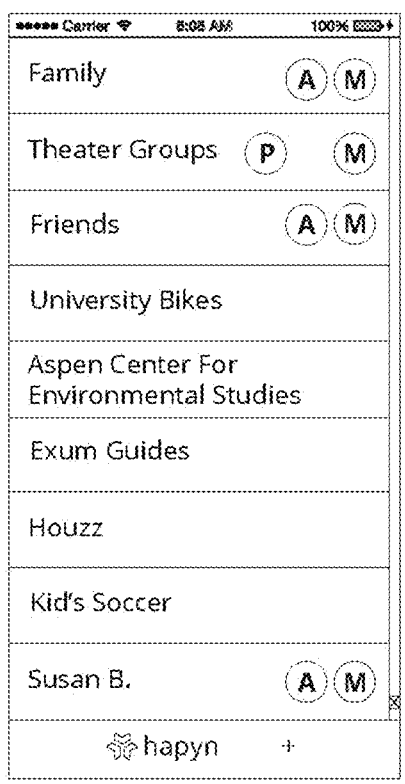
FIGS. 15A-15B are smartphone wireframe diagrams depicting one way of accessing the Manage Page, in this example, for managing User Profiles, Preferences and Account details.
Figure 15B:
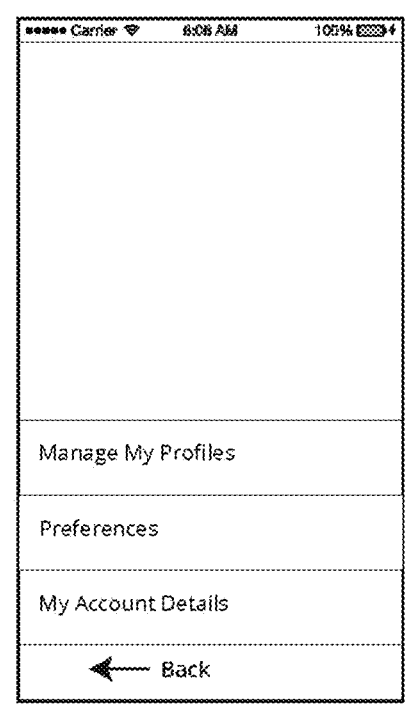

FIGS. 15A-B depicts one way to access the Manage Page for the application of the invention. The Manage Page is the place where the user manages such things as user profiles, preferences (both of which may differ for each tracked object) and account information. Specifically, a single tap of the touch sensitive block containing the logo and word "hapyn" at the bottom of the screen page 15A takes the user to the manage page, FIG. 15B, while single tapping the word back and associated back arrow at the bottom of the FIG. 15B page takes the user back to FIG. 15A. Alternatively, the Manage page may be accessed by tapping the like touch sensitive logo/word block at the bottom of the messages stream page, FIG. 5, in which event the "back" function returns the user to the FIG. 5 page.

Figure 16A:
FIGS. 16A-16D are exemplary smartphone wireframe diagrams depicting a User Profiles feature of the invention, in this example, for enabling a user to create different personal profiles for each of the different groups or activities, that is, tracked objects in which the user is involved.
Figure 16B:

Single tapping the "Manage My Profiles" block in FIG. 15B, opens the master manage profiles page shown in FIG. 16A, as visually denoted by the "My Profiles" caption block. The back arrow/word at the bottom of FIG. 16A returns the user to the page, FIG. 15B. The FIG. 16A page lists all the tracked objects of which the user is a member. Unlike the list page, FIG. 4, a single tap on the tracked object identifier in the "My Profiles" page brings up the user's profile for that tracked object. The first block in the FIG. 16A list is "Default Profile." Single tapping this block brings up the user's Default Profile page, FIG. 16B. The user's default profile is the profile the user has chosen to associate with all tracked objects for which no custom profile is established. In FIG. 16B, Doug Hammer has created an extensive default profile including contact information (in the tap to expand block), a resume document, two photos, a video, another document and a sound file. Instead of using touch sensitive blocks for opening each profile item, the profile page may be composed of a scrollable page of continuing information in various attractive visual forms. The profile page may open cloud computing center resources associated with the controlling application software thereby to facilitate easy and attractive composition of the constituent elements of a profile.

Tapping the word Back and the associated back arrow at the bottom of FIG. 16B returns the user to the master profiles page, FIG. 16A. Tapping on the "+" at the bottom right of FIG. 16 B brings up a page which allows the user to add to, subtract from or otherwise modify the information for that profile.

Figure 16C:
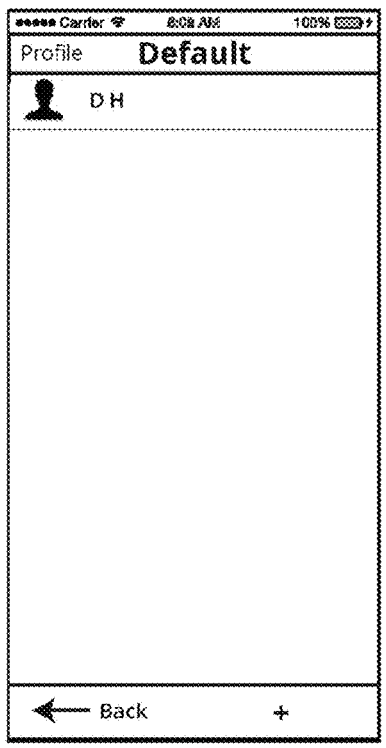
Figure 16D:
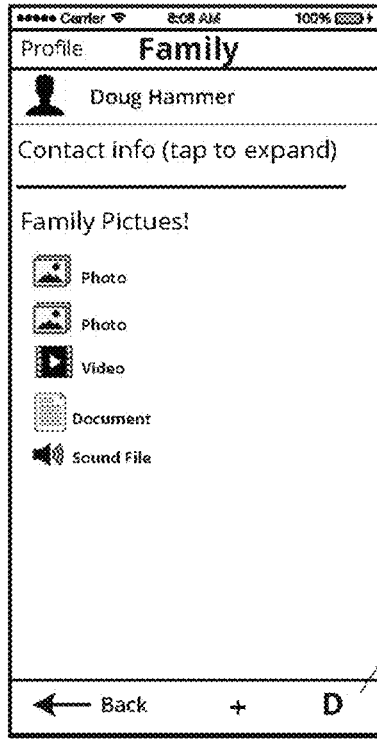

As shown in FIG. 16C, the user, DH, has chosen a minimal default profile that simply provides initials, and such other information as may be required by the system for all profiles. FIG. 16D is Doug Hammer's exemplary custom profile for "Family." This profile is composed by tapping on the "Family" tracked object block in FIG. 16A which opens the Family profile page, FIG. 16D, to enable the user to compose a unique profile for "Family" on single tapping the "+" symbol. In FIG. 16D, Doug Hammer has composed a profile comprising contact and family related information, such as family photos, but has eliminated his resume and other information specified in his default profile, FIG. 16B. Tapping the letter "D" in the bottom control block of FIG. 16D signals the system to select or revert the custom family profile of FIG. 16D to the default profile of FIG. 16B, or the alternative default profile shown in FIG. 16C.

Figure 17A:
FIGS. 17A-17C are smartphone wireframe diagrams depicting a Manage Preferences feature of the invention, specifically a User Preferences Page FIG. 17A for enabling a user by gesture action to open individual preference pages, here the exemplary preference pages Default FIG. 17B and Family 17C for which the user has selected different preferences.
Figure 17B:
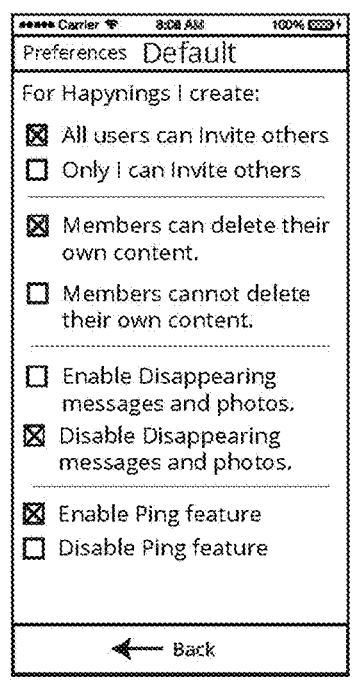
Figure 17C:
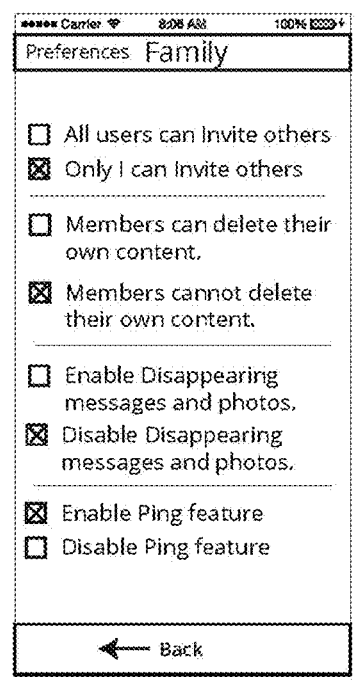

A single tap of the "Preferences" block in FIG. 15B opens the Manage Preferences page, FIG. 17A, as visually indicated by the page caption "Preferences," while a single tap on the word back and associated arrow returns the user to the Manage Page, FIG. 15B. Similar to the manage profiles page, the preferences page has a "Default Preferences" block as the first selection followed by a listing of all of the tracked objects of which the user is a member. A single tap on any of the foregoing blocks takes the user to a preferences selection page that may offer the same choice of preferences for all tracked objects and for the default selection. FIGS. 17B and 17C show like preference selection pages where different preference selections have been made for "Default" and for "Family." Because every tracked object has a unique identifier, the system is easily able to manage different profile and preference selections for every tracked object. The default preferences are those applicable to all tracked objects where the user has not made custom preference selections.

FIGS. 17B and 17C show exemplary preference choices selected for Default and Family. As shown, the preferences may include such things as who may invite others to a tracked object, whether or not members may delete their content, whether message content including photos may "disappear" within a specified time akin the well-known app "SnapChat," and whether or not a Ping feature, presently to be described is enabled or disabled. Those skilled in the art will recognize that any of a wide range of other preference selections may be made consistent with the present invention and that the resources available from many cloud platform providers make implementation of such preferences easily within the skills of those of ordinary skill. The Account details page is accessed in like fashion to that described for preferences and manage my profiles. The particulars of the account detail page, not shown, includes in usual fashion all the information required by the system operator for accessing to the system, access to special system features, and any other information that is either optional or required by the system provider.

Figure 18A:
FIGS. 18A-18E are exemplary smartphone wireframe diagrams schematically depicting a further enhancement of the first embodiment, namely, the addition of separately selectable subsections of the About Page shown in FIGS. 8-9.
Figure 18B:
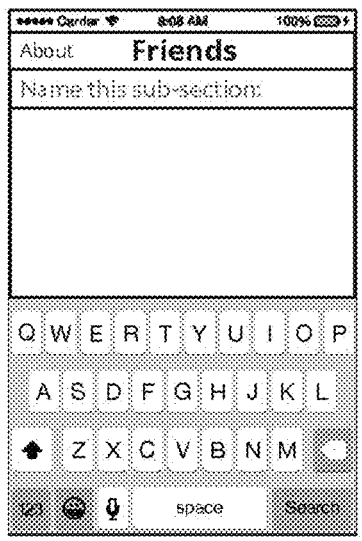
Figure 18C:
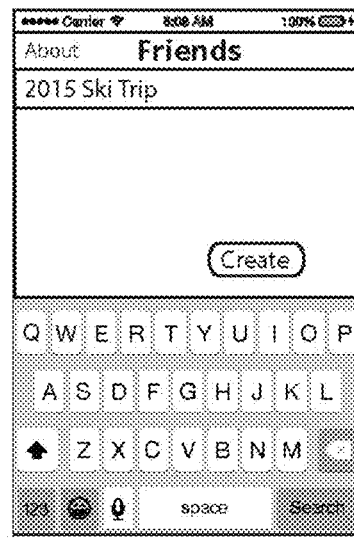

FIGS. 18A-18E depict an About page subsections feature that may be incorporated into the About page, shown in FIGS. 8-9. FIG. 18A is identical to that of FIG. 8A, except FIG. 18A includes a touch sensitive "+" symbol on the far right of the About page title block for the Friends tracked object. A single tap on the "+" icon opens a sub-section of the About page, which offers the user the option of separately naming the subsection, as shown in FIG. 18B. FIG. 18C depicts that the user has named the subsection "2015 Ski Trip." The user may then populate the subsection page with information of a kind and type available for populating the main About page, as explained in connection with FIGS. 8-9.

Figure 18D:
Figure 18E:

Naming the subsection as shown in FIG. 18C enables direct access to the subsection page, FIG. 18 E from the About page FIG. 18D. Specifically, single tapping the touch responsive subsection name block "2015 Ski Trip" in FIG. 18D opens the 2015 Ski Trip sub-section page FIG. 18E. The subsection page FIG. 18E is populated with photos, videos, documents, sound files and the like, as desired, in the same manner as earlier described in connection with FIGS. 8 and 9. FIG. 18E depicts that the user has chosen to populate the subsection with three photos or photo albums and one or more videos. The subsection feature gives even greater depth and utility to the About page. For example, with a series of subsections (and the provision of appropriate cloud based utilities for such subsections), an individual, a business (profit or nonprofit) and, indeed, any group may create with relative ease an About page that is the equivalent of even a reasonably sophisticated website, but which is easily accessible to users of the tracked object ecosystem. All of this may be accomplished with relative ease by an ordinary person having no skill or experience in the design of websites.

Figure 19A:
FIGS. 19A-19C are exemplary wireframe diagrams depicting an invention feature of making public selected About page subsections.

FIG. 19 illustrates by example a further feature that be included in the About page. Specifically, FIG. 19A depicts the user selectable option for making the About page as a whole or any one or more About page subsections "public," that is, available to anyone in the tracked object ecosystem, and even generally available on the internet (and discoverable by a Google search or the like). The public/private selection boxes are brought into view in this example by the user swiping from right to left across the subsection title box, here 2015 ski trip.

Figure 19B:
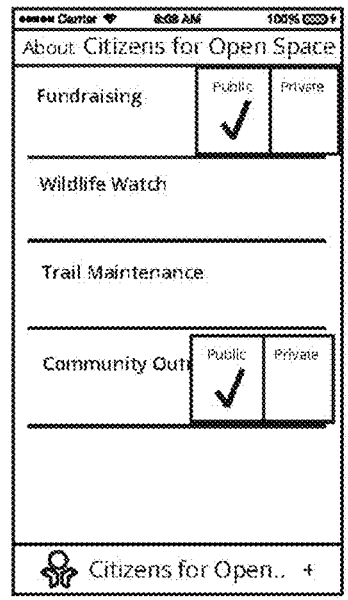

Typically, the default selection for the About page would be private, and an affirmative step, with explicit notification, required to make the About page or any of its subsections public. FIG. 19B depicts an About page for a "Citizens for Open Space" public interest group that may be local, national or international in scope. In this example, the group has made its fundraising and community outreach subsections publicly accessible while maintaining its wildlife watch and trail maintenance subsections private.

Figure 19C:
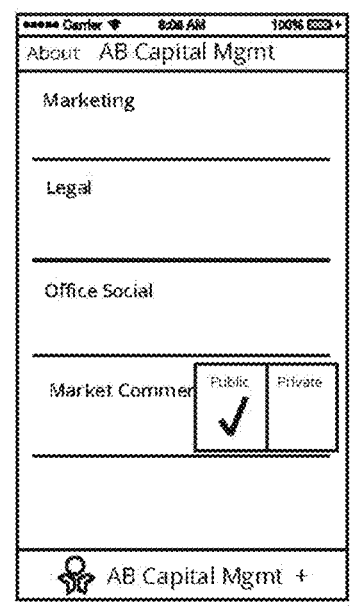

FIG. 19C depicts an About page for the "AB Capital Mgmt" firm. The marketing, legal and office social subsections are private, but the firm has opted to make its "Market Commentary" subsection available to the public, as shown.

Those of ordinary skill will recognize that the make public feature may be an app entirely separate from the tracked object private app thereby to avoid inadvertently making private matters public. Such "public" embodiments of the invention may incorporate the private features disclosed. A public embodiment has wide ranging utility for many environments including public interest groups, worldwide collaborations and innumerable others.

Figure 12:
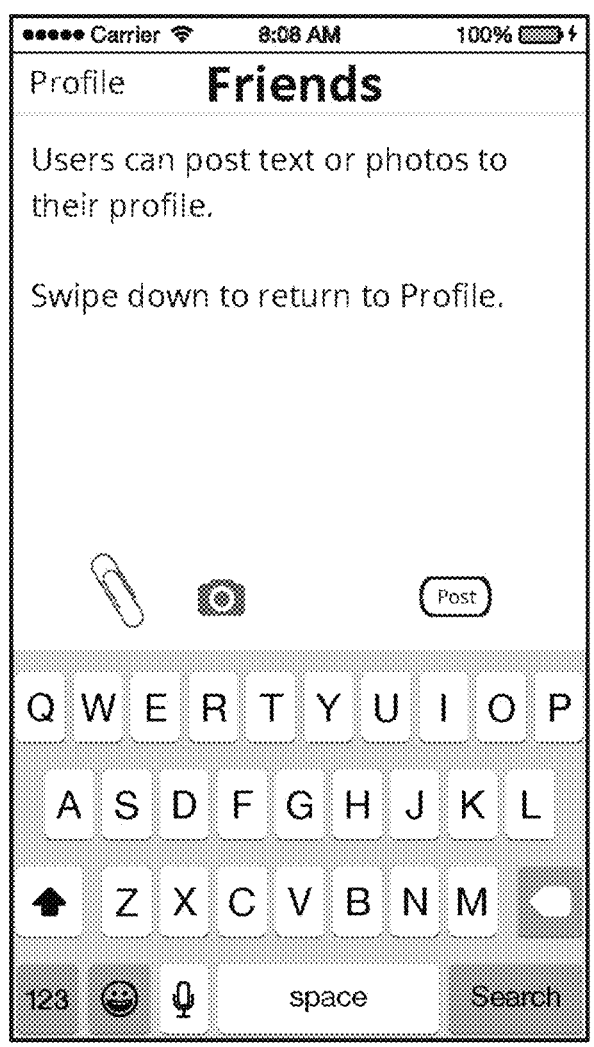

FIGS. 20A-20D depict enhancements to the profile page earlier described in connection with FIGS. 11-12. The tracked object creator, here Doug Hammer, is preferably listed at the top of the Who page so that anyone will recognize at a glance who created the tracked object. All of the other individuals identified were either invited to the tracked object by Doug Hammer or by other members of the tracked object, if Doug Hammer enabled such an option in his preference selections for Friends. Single tapping any name in the Who list opens the profile page for that individual, as earlier described. Here one of the members has opened the Andy Olin profile, which may include all of the features for profiles as earlier described in connection with FIGS. 11-12. The user may back out of the FIGS. 20A and 20B pages by single tapping the word back and associated arrow in the bottom block.

Figure 20A:
FIGS. 20A-20D are exemplary wireframe diagrams depicting enhancements to the user profile feature of the invention.
Figure 20B:
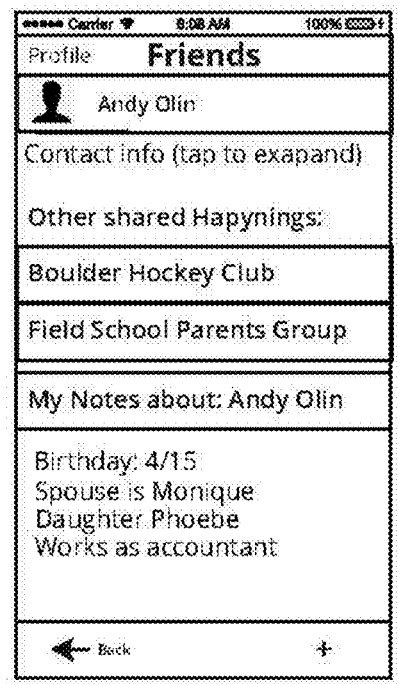

FIG. 20B includes two significant enhancements to the profile page, namely, a section identifying those tracked objects (Hapynings$^{SM}$) that Andy Olin and the user have in common and a section for the user to make private comments or additions to the profile of Andy Olin. The tracked objects in common feature is automatically implemented at the cloud computing center by the system identifying tracked objects where the user and Andy Olin are both members. Thus, no independent action is required by the user to identify the tracked objects that Doug Hammer and Andy Olin have in common. Tapping on a particular common tracked object in FIG. 20B takes the user to that tracked object message stream, as earlier described in connection with FIG. 6. The user opens the private comments section for Andy Olin by single tapping the "+" symbol thereby the user to make any desired additions or changes to his private comments for Andy Olin. Any information in the private comments section is visible only to the writer. The invention puts the onus on each member of the tracked object, and in general all members of the tracked object ecosystem, to keep their own profiles up to date, but enables the user to record for personal use in the profile page of that individual any further information desired.

Figure 20C:
Figure 20D:

FIGS. 20C and 20D depict that Andy Olin has used the make public feature of FIG. 19 by single tapping "Public Profile" in FIG. 20C and then composing his public profile as shown in FIG. 20D. Public profiles may be discovered by search thereby to enable persons with like or common interests to associate.

FIGS. 21A-21F depict what is here called the "Ping Group" feature of the invention for initiating and carrying on conversations/communications with any subset of a tracked object group. Absent the ping feature all communications made by any tracked object member are communicated to all other members. The ping feature is also useful in communicating with all members, but on separately identified subjects thereby to keep a wide range of communications and conversations separate and well organized. A closely similar feature, called conversations, is disclosed in the above-identified parent patent applications.

Figure 21A:
FIGS. 21A-21F depicts an additional feature of the invention, namely, Ping Groups, which enables users to select subsets of a member group from the Message Page and privately communicate with each subset.
Figure 21B:
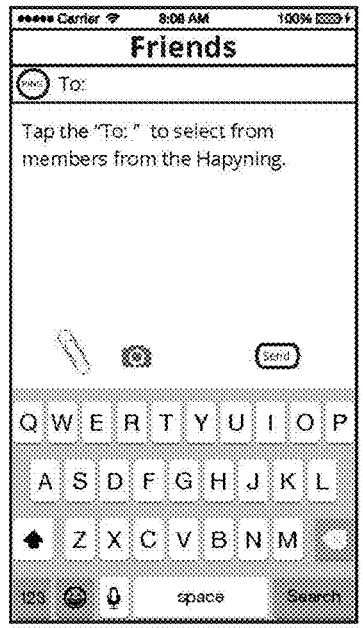

FIG. 21A is the same as the tracked object message reply page earlier described in connection with FIG. 7, except at the bottom of the FIG. 21A reply page there is an additional icon, namely, the word "Ping" in a circle. A single tap on the ping icon opens the "To:" addressee line, the ping icon being to the left of the "To:" to remind the user that the ping feature is active. A single tap on the ping icon in FIG. 21B opens a menu page offering the user the option of pinging all members or any on more members simply by single tapping the appropriate identifier. Alternatively, a single tap on the ping button in FIG. 21A could take the user directly to the FIG. 21C page.

Figure 21C:

In FIG. 21C, the user has chosen to ping Andy and Monique Olin, as depicted by the fact that their ping icons are highlighted in bold and by the fact that their names are the only ones shown in the "To:" line. Of course, visual feedback identifying which tracked object members have been selected by the user may be done in any other convenient way, such as by eliminating the ping icon adjacent each name and instead having the names of selected individuals depicted in bold when they are selected.

Figure 21D:
Figure 21E:
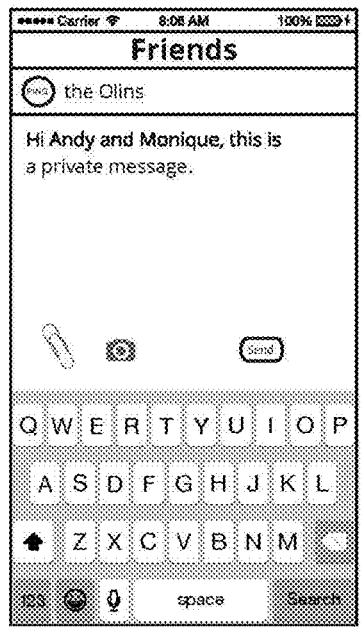
Figure 21F:
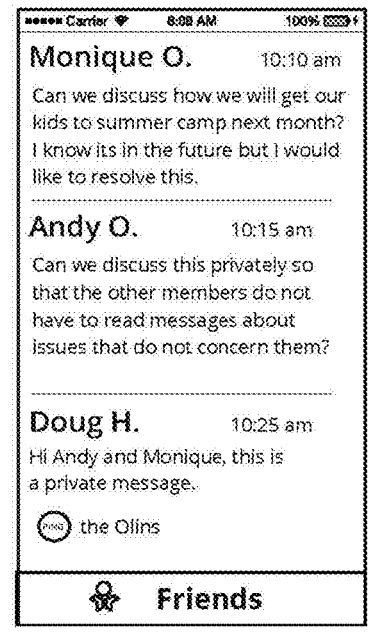

FIG. 21C offers the user the option of naming the ping group. FIG. 21D depicts that the user has chosen to name the ping group "the Olins" by tapping the button "send" in FIG. 21C. If the user is satisfied with the ping group as selected and the ping group name selection, the "Done" button is single tapped thereby to close the page FIG. 21D and concurrently open the message composition page for this ping group, FIG. 21E. In FIG. 21E, the user has composed a message for the Olin ping group; single tapping the "send" button there "sends" the message to only the Olins. FIG. 21F depicts the ping message in the flow of messages for the Friends tracked object. The fact that this message has gone only to the ping group named "the Olins," is denoted by the word ping in a circle and the identifier "the Olins" at the bottom of Doug H's message. Other than for the ping group selection and the optional ping group name selection, the message is composed and sent in the same manner as a message to the entire tracked object group, as earlier described in connection with FIG. 7. Single tapping any message in a ping group takes the user to the message stream for only that ping group thereby to always enable all ping group participants to separately ping group messages in full context.

Figure 22A:
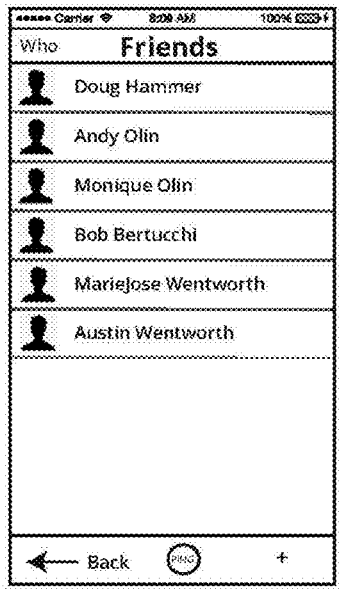
FIGS. 22A-22F are exemplary wireframe diagrams depicting how the Ping Group feature is accessed and used from the Who Page, instead of from the Message Page as shown in FIGS. 21A-21F.

The ping group feature is also accessible from the Who page, FIG. 22A, which may in all other respects be the same as the Who page, FIG. 10 earlier described, except for the the presence of the word "ping" in a circle on the left side of the bottom bar in FIG. 22A. Single tapping the ping icon brings up the page, FIG. 22B, which lists all pre-existing ping groups, if any, and sets the stage for pinging an existing ping group or creating a new one. First, single tapping either of the pre-existing ping groups in FIG. 22B opens the message page for composing and sending of a message to that group, as earlier described. The user may back out of the pages FIGS. 22B and 22A to return to the prior page by tapping the back arrow.

Figure 22B:
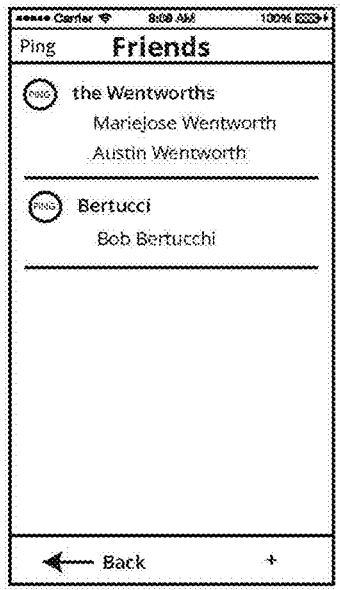
Figure 22C:
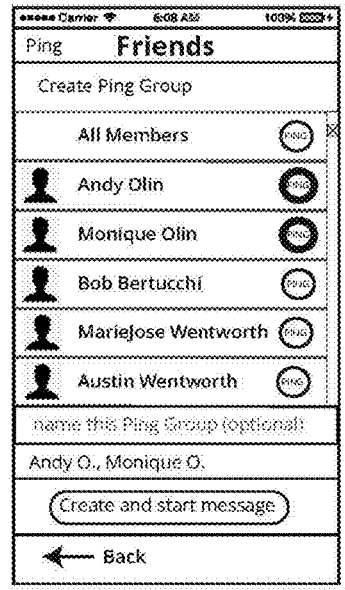
Figure 22D:
Figure 22E:
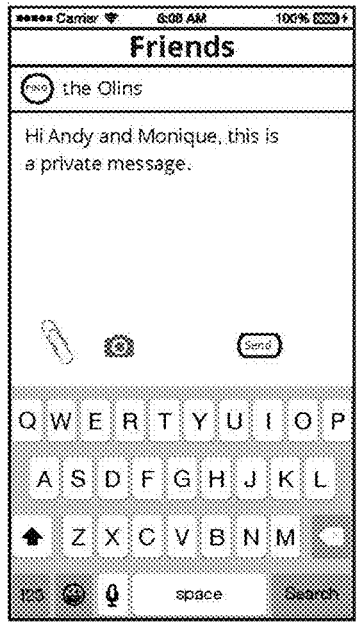
Figure 22F:
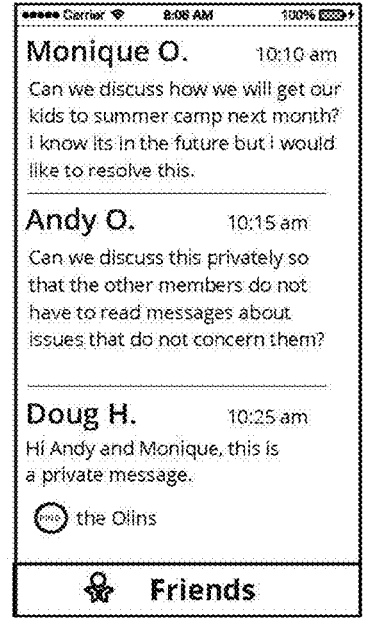

If the user desires to create a new ping group, the user single taps the "+" symbol at the right on the bottom bar in FIG. 22B, which opens the page, FIG. 22C, for creating a new ping group. As shown, the first choice is "All Members," which is selected to open a new and separate conversation on a specifically named subject relevant to the group as a whole. The remaining choices in FIG. 22C are each of the individual members of the tracked object, Friends, which may be selected in any number and combination desired, and the ping group named or unnamed, as desired. As shown in FIG. 22C, the block containing the phrase "name this Ping Group (optional)" is where the ping group name is typed in. Single tapping the foregoing phrase brings up the type writing screen, as is conventional. FIG. 22D depicts that the user has named the ping group with the two selected members as "the Olins." Single tapping the "Create and start Message" block brings up the message composition page FIG. 22E, which is the same as the FIG. 21E page reached by a different route. FIG. 22F depicts the sent ping message in the tracked object message stream, Friends, which is the same as FIG. 21F earlier discussed, but reached by a different route.

Figure 23A:
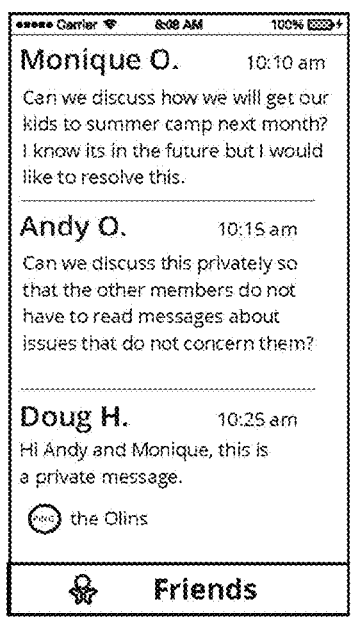
FIGS. 23A-23C are exemplary wire frame diagrams depicting drilling into a ping stream, specifically viewing a ping conversation separately from the main message stream.
Figure 23B:
Figure 23C:

FIGS. 23A-23C depict a "drilling into ping stream" feature by which all of the messages in any and all the ping group conversations may be viewed separately from the other messages in the Friends message stream. FIG. 23A is the same as FIG. 21F, but is reproduced here for clarity of explanation. Single tapping the Doug H ping group message in FIG. 23A takes the user to the message stream for "the Olins" ping group, which at the moment only contains the message from Doug H, who created the ping group. The bottom block of FIG. 23B for the group friends now also includes the ping in a circle icon and the name of the ping group, here "the Olins," thereby to clearly delineate for, and remind the user that, the user is in the Olin ping group message stream of the tracked object message stream, Friends. The Olins reply to the Doug H. ping group message by tapping on it, e.g., in FIG. 23B, which brings up the standard message reply screen FIG. 23C, except this Reply screen includes in the header block Friends the word ping in a circle and adjacent the assigned ping group name thereby to clearly indicate that the reply is being made to the Olins ping group.

Figure 24A:
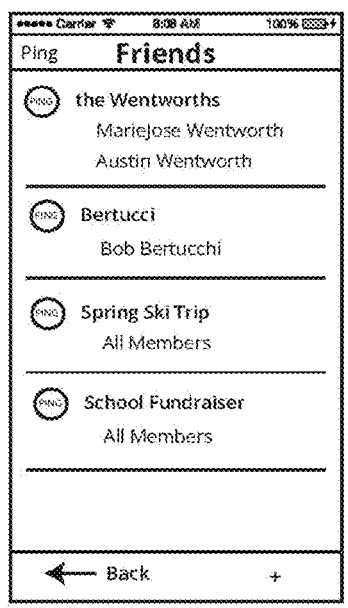
FIGS. 24A-24C are exemplary wire frame diagrams depicting how ping groups may be used as an organizational feature.
Figure 24B:
Figure 24C:
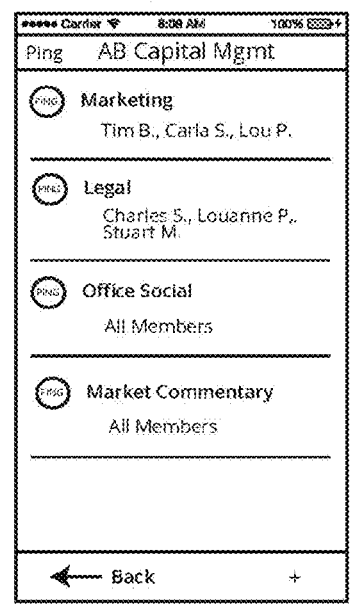

FIGS. 24A-24C depict how ping groups may be used as an efficient organizational tool. Specifically, FIG. 24A depicts the several ping groups earlier created by one user in the group, Friends, of which some are defined by the names of the ping group members, as Bertucci, and some by subject matter, i.e., Spring Ski Trip and School Fundraiser. This ping group listing page keeps the multiple conversations in friends separate, but easily and individually accessible to the user.

FIG. 24B depicts the listing page for the ping groups formed in the tracked object Citizens for Open Space. Here all members are in all ping groups, but each group is separately named by subject matter. FIG. 24C depicts the listing page for the ping groups within the financial firm AB Capital Management. All are identified by subject matter, such as Marketing, Legal, Office Social and Market Commentary, but two of the named ping groups, Marketing and Legal, include only specific, different subsets of the members of AB Capital Mgmt.

Figure 25A:
FIGS. 25A-25D are exemplary wire frame diagrams depicting how public ping groups are created from private tracked object groups.
Figure 25B:
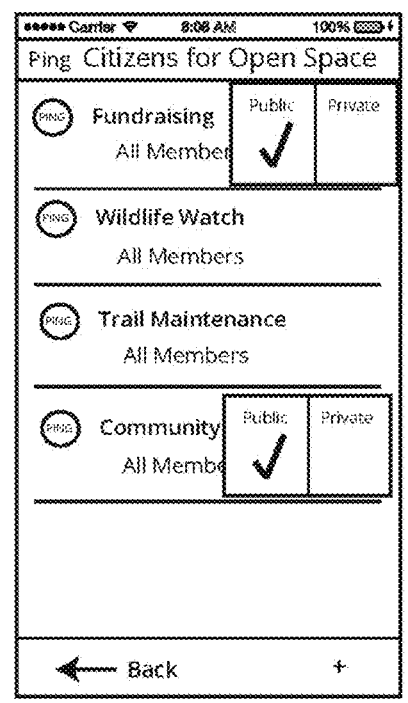

Earlier, in reference to FIGS. 19A-C, there was described a way to make all or selected portions of a tracked object About page public, and the utility in doing so. FIGS. 25A-25D depict how private ping groups can be made public either in part or in whole, and either at the time of their creation, or thereafter if allowed by the system rules. Specifically, FIG. 25A depicts the existing ping groups within the organization, Citizens for Open Space. FIG. 25B depicts a menu (reached by swiping to the right on the Fundraising block) that allows the user to select public/private for a Ping group. Here Fundraising and Community Outreach have been made public for obvious reasons.

Figure 25C:
Figure 25D:
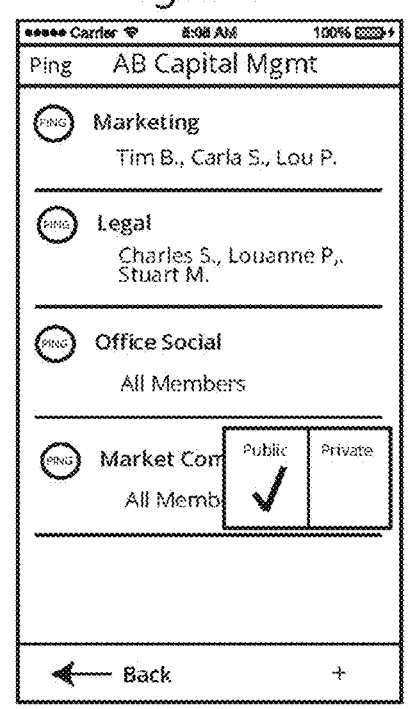

To avoid inadvertently making private matters public, the selection of public is preferably done only be a system administrator, by the tracked object creator or persons explicitly authorized by them. This also obviates the possibility that a disloyal group member could make private ping group conversations public. FIG. 25C depicts exemplary private ping groups for AB Capital Management. FIG. 25 D depicts how a selected AB Capital Mgmt. ping group, Market Commentary, may be made public and the utility in doing so, that is, attracting a large, public following of the firm's market commentary.

Figure 26A:
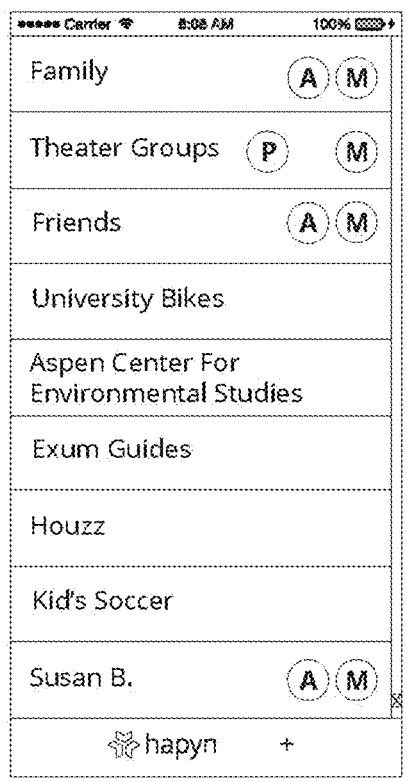
FIGS. 26A-26B are exemplary wire frame diagrams depicting how additional types of tracked objects are made available through the Manage page, FIG. 26B.
Figure 26B:

FIGS. 26A-26B disclose how other tracked object types may be created from an enhanced Manage Page, FIG. 26B. Like the Manage page, FIG. 15 earlier described, the FIG. 26B Manage page is accessed by tapping the logo and adjacent word "hapyn" on the bottom of the list page, FIG. 26A. A single tap of the word "back" and the back arrow in the gesture sensitive control block at the bottom of FIG. 26B returns the user to the list page, FIG. 26A. Of course, the back arrow alone may be deemed a sufficient indicator for most mobile device users so it may be preferable to eliminate the word "back" to maintain consistency with the intended visual simplicity of the user interface.

The Manage page FIG. 26B has three additional, exemplary tracked object choice categories not found on the FIG. 15B manage page, specifically create public, create business and create classified. While these category choices are shown as directly accessible from the Manage Page FIG. 26B of the private tracked object application, it will be understood that it may be desirable to establish entirely separate mobile apps for private tracked objects and those that are not private. Business, public and classified are intended to reach large, often wholly unrestricted audiences for, among other things, fundraising or commercial purposes and, for such reason, have different tracked object properties, as assigned by the cloud computing center, than do private tracked objects.

For convenience, each of these new categories will be described in turn in the context of being separate choices on the Manage Page, FIG. 26B. A single tap on the create public, create business and create classified selection blocks in FIG. 26B takes the user to, respectively, FIGS. 27-29 which depict via wire frame diagrams how exemplary public, business and classified tracked objects are composed. Those skilled in the art will recognize that the extraordinary resources of cloud computing centers, available at relatively low cost, offer the opportunity to those of ordinary skill in the art (or less) to compose highly sophisticated and attractive, website quality and beyond, and linked three (or more) channel social communication platforms, using the teachings of the present invention.

Figure 27A:
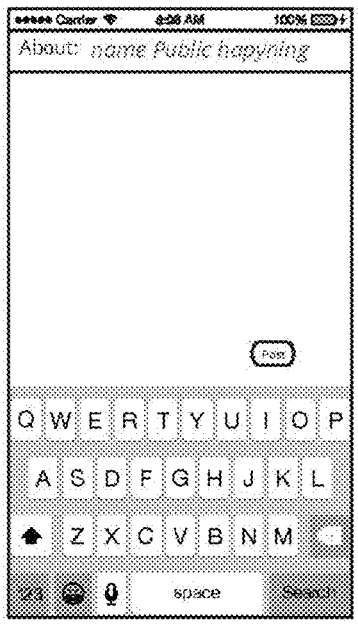
FIGS. 27A-27F are exemplary wire frame diagrams depicting the creation of a new public tracked object from the Manage page, FIG. 26B.
Figure 27B:

FIGS. 27A-27F depict a further feature of the invention, namely, how a public tracked object is created and how it is beneficial to large groups of individuals and to many types of public organizations, profit and nonprofit. As earlier stated, a single tap on the first choice in FIG. 26B, Create Public, opens the page, FIG. 27A. FIG. 27B depicts that the user has chosen the name "Boulder City Council" for this public tracked object. A single tap of the "post" button in FIG. 27A takes the user to the About screen page FIG. 27B for the Boulder City Council. Posts to the Boulder City Council About page are made from FIG. 27B in a manner previously described for About page posts. All authorized persons (as set by preferences) may post information to this tracked object, and the public at large may follow the postings.

Figure 27C:
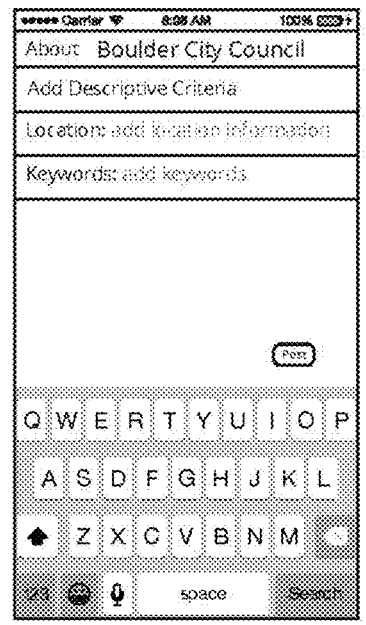
Figure 27D:

As shown in FIG. 27D, a single tap of the "+" symbol on the far right of the tracked object name opens a screen to enable the user to name About page subsections, or folders. In this regard, as shown in FIG. 27D, the user has created three separate such subsection folders, park maintenance, budget and trash collection. Each of these subsections and more may be populated with information in the same manner as the main About pages. The subsections may be viewed separately by single tapping the desired subsection block. If desired, a public commentary section for receiving feedback from the public may be a part of the About page and/or one or more subsections.

Figure 27E:
Figure 27F:

FIG. 27B includes a "criteria" button which opens the page FIG. 27C. As there depicted, the user may add various descriptive criteria to more particularly identify and facilitate discovery of the public tracked object, such as a general "add descriptive criteria" section, location and keywords. FIGS. 27E and 27F depict two exemplary public About pages for, respectively, an anonymous group of photojournalists reporting the latest from Baghdad and the Middle East conflicts, and a public interest nonprofit, Save the Whales. There are innumerable other uses for the public tracked object feature.

Figure 28A:
FIGS. 28A-28D are exemplary wire frame diagrams depicting the management of preferences for public tracked objects.
Figure 28B:

FIGS. 28A-28D depict a manage public preferences feature. FIG. 27A shows a preferences page listing the user's tracked objects, public and private, in separate folders called private, public and business. As indicated by the up and down pointing triangles, the private and business folders are closed while the folder for public tracked objects is open. As shown in FIG. 28B, the user has single tapped the preferences block for the Boulder City Council which bring up the preference selection page for this tracked object, FIG. 28B. FIG. 28B schematically depicts a sampling of some of the preference options that may be offered with respect to a public tracked object, such as allowing/not allowing: (a) comments; (b) deletion of a member's own content; (c) messages and photos to disappear after a preset time; and (e) the ping feature earlier described.

Figure 28C:
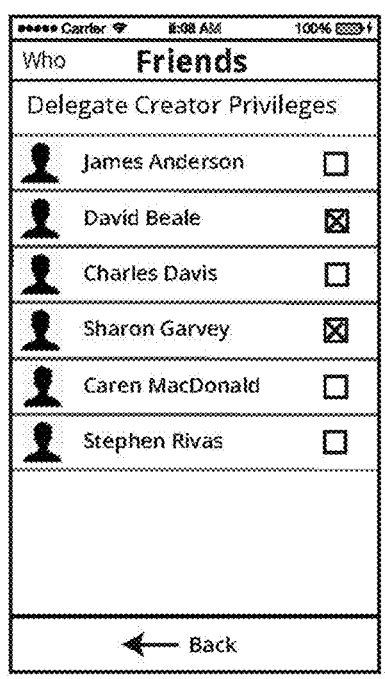
Figure 28D:
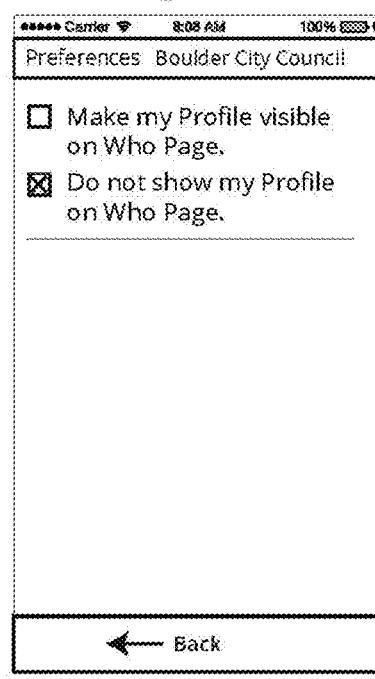

Screen page FIG. 28C is reached with a single tap of the "Delegate Creator Privileges" block at the bottom of the creator view screen page, FIG. 28B. As shown in FIG. 28C, the tracked object creator has authorized two other individuals to post information to the Boulder City Council About page. FIG. 28D shows the Boulder City Council preferences page for a non-creator member of this tracked object, such as might be available to Boulder employees in various departments. This user has opted to not show his or her profile on the Who page for this tracked object.

FIGS. 29A-29F depict how the invention may be advantageously used by businesses to create social communications channels with actual and prospective customers and to further provide, among other things, high quality and website type quality information to and interaction with customers including commercial transactions. To create a business tracked object, it is first necessary to select "create a business hapyning" in preferences on the Manage Page, FIG. 26B. This selection make available cloud based resources specifically selected for businesses and assures that business based tracked objects are grouped on the list page in a folder separate from, for example, the folders for private and public tracked objects. The folder separation of public, private and business tracked objects is shown in FIG. 28A.

Figure 29A:
FIGS. 29A-29F are exemplary wire frame diagrams depicting application of the invention to the creation of a new business tracked object from the Manage page, FIG. 26B.
Figure 29B:

The FIG. 29A screen page is opened with a single tap of the create business button in FIG. 26B. As shown in FIG. 29B, and as should now be familiar, the user has named the tracked object, here University Bikes, and is about to post information to its About page. As earlier described with respect to public, a single tap of the "+" symbol in the header of FIG. 29B, opens a page enabling user selection and naming of About page subsections or folders. In FIG. 29B, the business has created a purely social activity subsection (albeit one relevant to its business), Saturday Bike Rides, a customer help subsection, Bike Maintenance Tips, to promote customer loyalty and a subsection to make its online members aware of a sale of "Clearance Merchandise," perhaps in advance of making such sale generally known to the public.

Figure 29C:
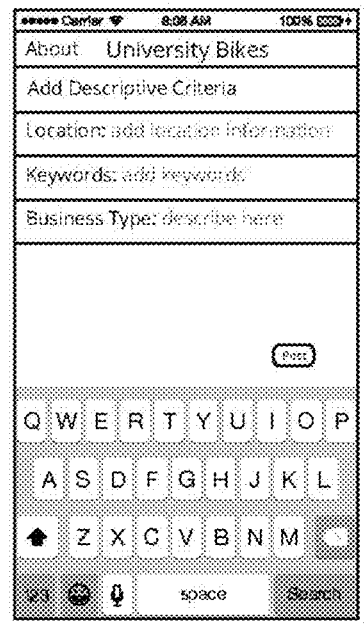
Figure 29D:

Single tapping the "criteria" button in FIG. 29B opens the criteria selection page for this tracked object as shown in FIG. 29C. The business is there offered options of a kind earlier discussed in connection with public for making its business more easily discoverable to members of the tracked object ecosystem and perhaps the public at large. This section also allows the business to select keywords and the like to assure that the business will appear in all searches using the selected criteria. This benefits both the business and members of the ecosystem in making connection on matters of common interest, such as purchase/sale of a specified kind of road bike.

Figure 29E:
Figure 29F:
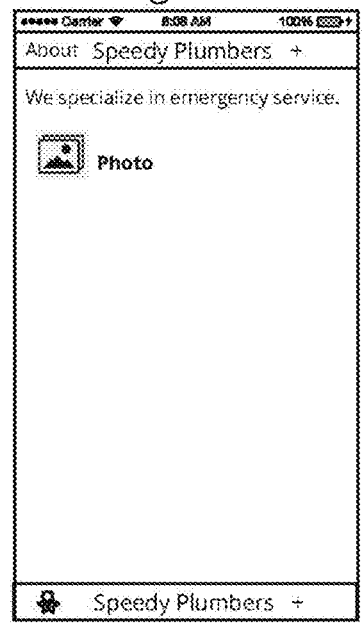

FIG. 29E depicts how a tracked object business presence and separate About page subsections may be useful to a various businesses, such as the popular online home furnishings retailer, Houzz, in establishing an online community, and one supporting actual sales transactions. Since creation of a business tracked object assures that it will be placed in a business folder on the list page, it is easily accessible to the mobile phone user (unlike having to search for a bookmark or a business website) having an interest from time to time in the goods and services offered by the business. Shifting customers to use of the system of the invention would eliminate the need to send customers a continuing barrage of emails as a means of maintaining a social contact with them. Users opt to receive machine generated emails if they have a strong desire to keep contact with a business and thereby receive timely notice of new merchandise, sales or the like, but no one enjoys receiving numerous machine generated emails randomly interspersed with more pressing matters. Thus many persons interested in the offerings of certain businesses opt out of receiving their emails because the annoyance exceeds the benefit. With the tracked object organizational structure of the invention, businesses and users both benefit as a business need not fear that an excess of communications will damage the customer relationship and a user is not bothered since the user visits the tracked object only when and if he or she has an affirmative interest in doing so. With business and public tracked objects in particular, the business or public entity may continually update and organize the subject matter on the About page so as to eliminate the need for the user to delete or archive anything. The experience may be made similar to visiting a highly interactive and attractive website designed for optimal user experience.

FIG. 29E depicts how a local business, such a lone plumber or handyman, and homeowners would find the present invention useful in maintaining relationships with customers/vendors. Keeping information on home vendors, such as electricians, plumbers, etc in a home vendor folder in the business section of the list page enables the homeowner to quickly identify and contact vendors with a minimum of effort, make requests for service, share photos, etc. Further detail on use of the invention by such small businesses is described at length in the parent patent applications earlier identified.

FIGS. 30A-30D are exemplary manage business preference pages that are very similar to and accessed in the same way as the earlier explained manage public preferences pages FIGS. 28A-28D. Accordingly, with the prior manage public explanation, the individual pages and selections of FIGS. 28A-28D are self-explanatory. In the business environment, unlike the private and certain public tracked objects, the incoming "messages" from business customers are private pings to the business. Individual customer members of the business tracked object are not typically identified on the Who page, nor are they visible to one another.

All business tracked object members are visible to the business and the individual customer member profiles are visible to the business. Customer profiles may include certain required entries in the nature of filling in a form, and may have various optional entries, such as whether the customer wishes to be notified of special sales, new merchandise or the like, and/or credit/debit card information for consummating purchases. Based on the answer to certain profile questions and other criteria, the business may create various ping groups thereby to enable the business to easily communicate with all customers who have a common or shared interest. Those skilled in the art will recognize that the present invention offers new and different ways for businesses to maintain a sense of community with their customers thereby to better inform and serve their customers. The business tracked event feature is discussed in further detail in the aforementioned parent patent applications.

Figure 31A:
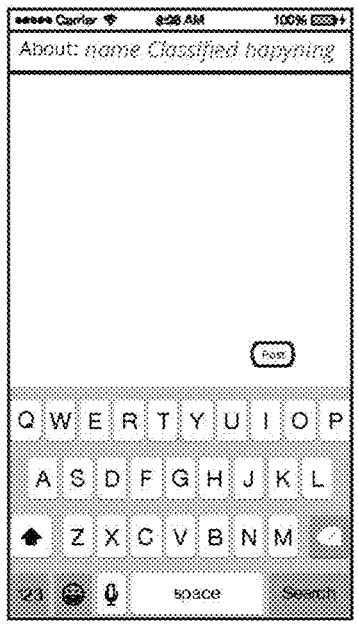
FIGS. 31A-31F are wire frame diagrams depicting the creation of a new classified advertising tracked object from the Manage page, FIG. 26B.
Figure 31B:
Figure 31C:
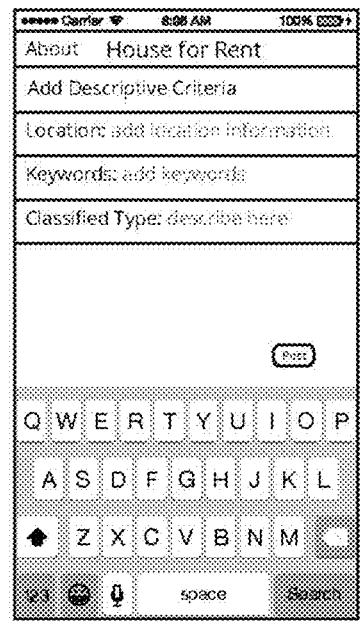
Figure 31D:
Figure 31E:
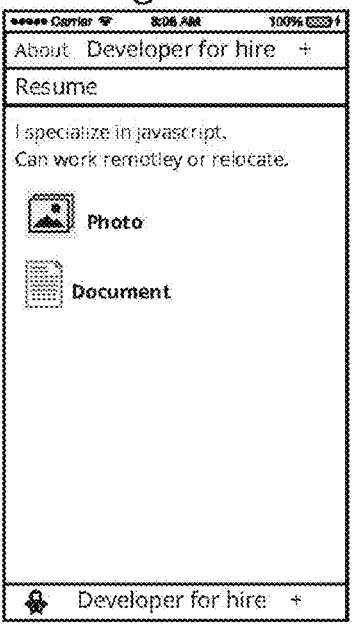
Figure 31F:

FIGS. 31A-31F depict the exemplary steps and associated page screens interacted with by the user to create a new classified advertisement tracked object. The screens and steps are similar to those used and earlier described in connection with the creation of new public and new business tracked objects, respectively, FIGS. 27A-27F and 29A-29F. The user names the classified ad in FIG. 31A. In FIG. 31B, the ad has been named "house for rent" and the user is offered the opportunity to populate the page with relevant photos, videos, text and the like. The "criteria" button of FIG. 31B and the associated criteria selection page FIG. 31C offers choices of a kind previously discussed in connection with FIGS. 27C and 29C, obviating the need for further discussion here. FIG. 31D depicts the ad as composed by the user with the tools available on the ad composition screen page, FIG. 31B. FIGS. 31E and 31F offer further examples of classified ads composed on the system. In FIG. 31E, a software developer has posted his resume, a photo and video text description of his software skills and how he is willing to work. In FIG. 31F, an individual has posted a bike for sale for $800 along with two photos and a request that any interested party send a message.

Figure 30A:
FIGS. 30A-30D are wire frame diagrams depicting an exemplary approach to the management of preferences for business tracked objects.
Figure 30B:
Figure 30C:
Figure 30D:
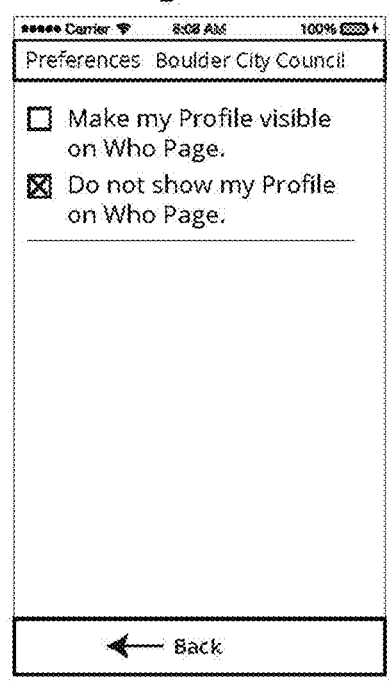

Single tapping the "Manage Advertising" selection block in FIG. 30B for University Bikes opens the like named screen shown in FIG. 32A which depicts exemplary selections for establishing the nature and scope of the advertising. The first selection offers "deals stream" and "deals tab" presently to be explained. The geographical limit selection enables the advertiser to limit the geographic scope of the advertising; for example, a restaurant in Boulder, Colo. may wish to limit its advertising to the greater Boulder area for the obvious reason that advertising money spent beyond that area will likely yield few customers. The next selection is the number of members in the tracked object; a resort hotel, for example, offering deals to only groups of twenty or more may wish to limit its advertising to groups of that size and greater. The selection "include members and hapynings active the last _____ days" may be used to avoid paying to advertise to individuals and groups that have been inactive for some time period, for example, ninety days. The additional choices are simply further examples of ways the system may offer a business different criteria for the spending of advertising dollars. When the choices are made, a single tap of the "Submit advertising with above criteria" button communicates the choices to the system which may provide an estimated or precise dollar cost for executing the requested advertising, the number of individuals that will be reached by the advertising and so on. With the user's approval, the requested advertising is then automatically implemented by the system.

Figure 33A:
FIGS. 33A-33B are wire frame diagrams depicting a Deal Stream feature of the invention.
Figure 33B:

FIGS. 33A-33B depict a Deal Stream feature of the invention, which is also described at length in the parent patent applications. In FIG. 33A, the user has organized his or her tracked objects in the folders named: private, public, business, classified and deal stream. The deal stream folder is made available in the user's list page, unless the user opts in a preference page to not accept the folder. A business opts for inclusion in the deals stream folder by making the "deals stream" selection in FIG. 32A. Just as it sounds, deals stream is a folder where special "deals" are offered by businesses. A user may visit the deal stream folder or not, and the user's preferences selections may include those identifying the nature and types of deals the user is interested in being placed in his deals folder. The preferences offered to the user on what to be included in the deals stream may be many and varied.

Figure 34A:
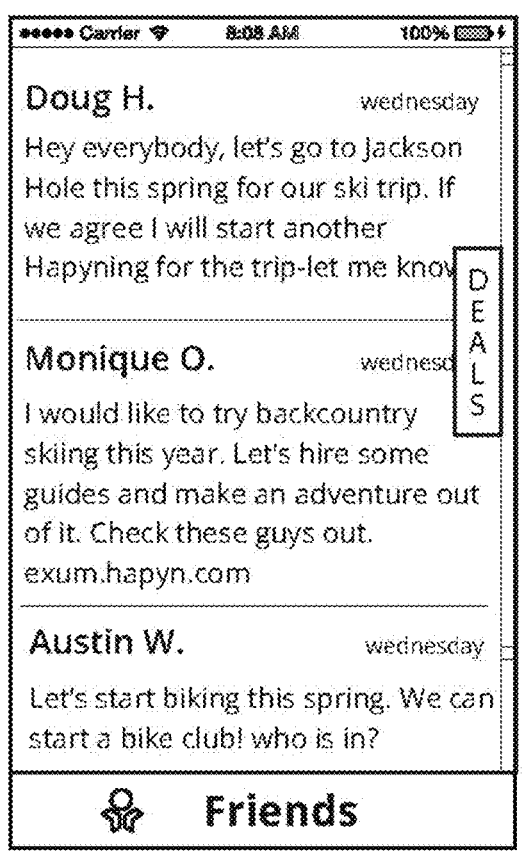
FIGS. 34A-34B are wire frame diagrams depicting a Deal Tab feature of the invention.
Figure 34B:
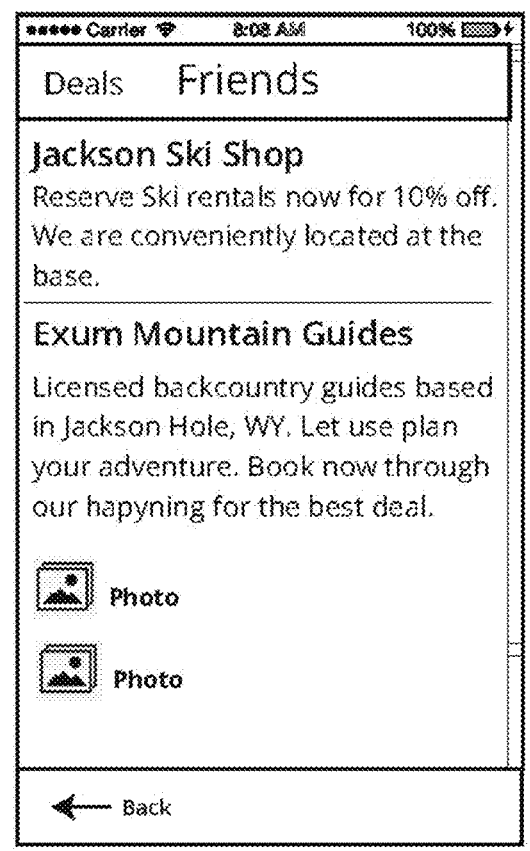

FIGS. 34A-34B depict a Deal Tab feature of the invention, which is also described at length in the parent patent applications. The deals tab is shown in a user's tracked object message streams, assuming the business has made the "Deals Tab" selection in the Manage Advertising page, FIG. 32A and the user has made preferences selections allowing the deals tab to appear in some or all of the user's tracked objects. As explained in further detail in the parent applications, the deals tab is populated with special "deals" based on keywords found in a tracked object message stream. Only the keywords are used for making the association; the user's identity is not compromised. When and if the user single taps the deals tab, FIG. 34A, the user is assured to see ads prompted by the words used in the tracked object message stream. For example, as shown in FIG. 34A, the participants are discussing backcountry skiing in Jackson Hole, Wyo. The opened deals tab, FIG. 34B, shows only ads relevant to the keywords in the message stream, FIG. 34A, namely, an ad for ski rentals from the Jackson Ski Shop and an ad from Exum Mountain Guides, a licensed Jackson Hole backcountry ski guide business.

Figure 35A:
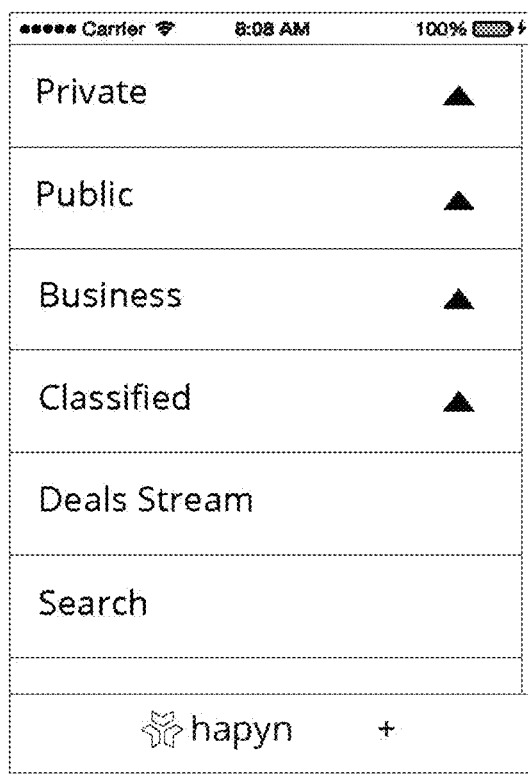
FIGS. 35A-35B are wire frame diagrams depicting a Search feature of the invention.
Figure 35B:
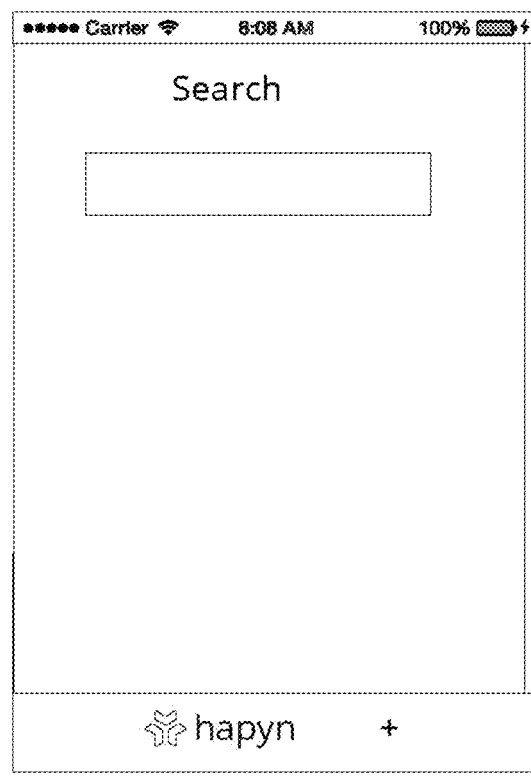

FIGS. 35A-35B depict in rudimentary, exemplary form a search feature by which users may discover other persons with public profiles, public groups, businesses or the like which are publicly searchable within the tracked object ecosystem and, if desired, via public search engines. FIG. 35A is the now familiar list page with the added gesture sensitive block, Search. Single tapping the search block opens the Search page, FIG. 35B enabling the user to run a search by keywords in familiar fashion or to initiate more targeted searches through use of various other criteria, as described in greater detail in the aforementioned parent patent applications.

I claim:

1. For hand-held mobile computing devices of a kind including (i) displays for generating information screens with predetermined screen portions responsive to user gestures, and (ii) electronics for wirelessly communicating, via a cloud computing and data storage center, with other such mobile devices, a graphical user interface for creating and managing device user social groups formed from among users of said mobile devices comprising:

(a) a first display screen for device users to initiate (i) composition of a device user's own profile and associated profile identifier, and (ii) selection of whether a device user's profile is public thereby to be discoverable by search or private thereby to not be discoverable by search, each device user selectively initiating uploading of the user's own profile and associated profile identifier for storage at the computing center, device users being able to edit only their own profiles and unable to edit the profiles of other mobile device users, and only the most recently edited profiles of device users being accessible for prospective viewing by other mobile device users;

(b) a second display screen for a device user to create a social group by specifying (i) other device users as members of the social group, (ii) a tracked object identifier, and (iii) a first message post to the social group;

(c) a third display screen for listing in a scrollable screen format, in separate gesture sensitive blocks, the tracked object identifiers for the social groups in which the device user is a member, the third screen having a first gesture sensitive navigation control portion the selection of which opens the second display screen in place of the third display screen, new social groups created on the second screen being automatically added to the list of social groups on the third screen;

(d) a fourth display screen, opening in place of the third screen on gesture selection of a particular tracked object identifier on the third screen, for displaying in a scrollable screen format the posts to the social group associated with the particular, selected tracked object identifier, each posted message specifying, in addition to the message post, only thea time and date of the post and the identity of the social group member making the post, the fourth display screen further having first and second gesture sensitive navigation control portions;

(e) a fifth display screen, opening in place of the fourth screen on gesture selection of a predetermined one of the navigation control portions of the fourth screen, for composing posts to the social group associated with the particular tracked object identifier, the fifth screen automatically including with the composed post the time and date of the post and the identity of the social group member making the post;

(f) a sixth display screen, opening on gesture selection of the predetermined other of the navigation control portions of the fourth screen, listing at least the profile identifier of a creator of the social group, the sixth screen having a gesture sensitive navigation control portion the selection of which opens the fourth display screen in place of the sixth screen;

(g) a seventh display screen, opening on gesture selection of a particular profile identifier on the sixth screen, for viewing the profile associated with the particular profile identifier selected on the sixth screen, the seventh screen having a gesture sensitive navigation control portion the selection of which returns the device user to the sixth screen; and (h) a display screen for the device user to create individual profile elements, and in which the user may mix and match profile elements to create a multiplicity of different profiles for selective use in different social groups.

2. The user interface of claim 1 in which (i) the sixth screen lists the profile identifiers of plural members of the social group, (ii) selection of a particular sixth screen profile identifier opens for viewing only the associated device user profile as most recently edited by the device user, and (iii) device users are prohibited from editing the profiles of other device users.

3. The user interface of claim 1 and further including an eighth screen accessible to at least the social group creator for composing, and editing, a profile about the social group including photos, videos, web links and websites, reference and other materials of common interest to the social group, and in which social group members view the most recently edited version of the about profile by selecting an associated about profile identifier located on a control screen portion of at least one of the screens three, four, six and seven.

4. The user interface of claim 1 and further including a new posts screen for viewing only new, unread posts from user selected ones of the social groups listed on the third screen, each new, unread post on the new posts screen identifying the member making the post, the date and time the post was made, the social group in which the post was made and including at least a predetermined portion of the post and further in which the device user may selectively remove posts from the new posts screen while such removed posts remain for viewing on the fourth screen and further in which the device user may select on the new posts screen to initiate a response to new, unread posts and further in which posts to which the user initiates a response from the new posts screen are automatically deleted from the new posts screen while such posts remain for viewing on the fourth screen, and further in which a device user may selectively add to, and delete from, the new posts screen social groups listed on the third screen.

5. The user interface of claim 1 in which a device user may create a plurality of editable public and private profiles and selectively use different profiles for different social groups.

6. The user interface of claim 1 in which at least the social group creator may attach files to individual posts, and further including a files screen associated with each social group, attachments to individual posts all being accessible for viewing from the files screen separately and independently from viewing them as attachments to individual social group posts.

7. The user interface of claim 1 in which the creation of a social group from the second display screen further includes a device user selectively applying predetermined rules and permissions to the group including at least two of (i) whether group members other than the group creator may post to the group, (ii) whether the group creator, or users designated by the group creator, may delete members from the group, (iii) whether group members other than the group creator may invite others to the group, (iv) whether the creator may designate the group as semi-public or public thereby enabling non-members of the group to discover the group by search, (v) whether the group creator may appoint group monitors with the same authority as the creator, and (vi) whether members may delete or edit their own posts.

8. The user interface of claim 1 in which advertising is directed to a user's device from the cloud computing center based on keywords used in social group content posts and not on information compromising the personal privacy of individual device users, and in which the advertising directed to user's device is viewable only upon a device user's affirmative selection of an advertising icon.

9. The user interface of claim 8 in which advertisers may specify limiting criteria for their advertisements including at least one of (i) business category, (ii) discount products and services, (iii) geographic range, (iv) zip code, (v) last post in a group thereby to avoid advertising to inactive groups, and (vi) time period the advertisement is available for viewing by device users.

10. The user interface of claim 1 and further including (i) a preferences screen for a device user to select the kinds of advertisements the device user is willing to receive from the cloud computing center; and (ii) a gesture sensitive icon, the affirmative selection of which by the device user is required to view the kinds of advertisements selected on the preferences screen.

11. The user interface of claim 1 and further including (a) an advertising composition screen for a device user to compose advertisements; and (ii) a user selectable icon for initiating transmission of advertisements to the cloud computing center for selective download to only those other device users that affirmative designate a willingness to receive such advertisements.

12. The user interface of claim 1 and further including a discount deal icon, affirmative selection of which is required for a device user to view discount deal advertisements transmitted to the user's device from the cloud computing center.

* * * * *